United States Patent [19]
Schofield et al.

[11] Patent Number: 5,550,677
[45] Date of Patent: Aug. 27, 1996

[54] AUTOMATIC REARVIEW MIRROR SYSTEM USING A PHOTOSENSOR ARRAY

[75] Inventors: Kenneth Schofield, Holland; Mark Larson, Grand Haven, both of Mich.

[73] Assignee: Donnelly Corporation, Holland, Mich.

[21] Appl. No.: 23,918

[22] Filed: Feb. 26, 1993

[51] Int. Cl.⁶ ............................. G02B 5/08; G02B 27/00
[52] U.S. Cl. .................... 359/604; 359/267; 359/601; 359/603
[58] Field of Search ..................... 359/264–267, 359/601–610, 38, 264–272; 250/204–205, 206.1–206.2, 208.2, 210

[56] References Cited

U.S. PATENT DOCUMENTS

| | | | |
|---|---|---|---|
| 3,601,614 | 8/1971 | Platzer, Jr. | 250/214 AL |
| 3,612,666 | 10/1971 | Rabinow | 359/604 |
| 3,665,224 | 5/1972 | Kelsey | 307/311 |
| 3,680,951 | 8/1972 | Jordan et al. | 359/606 |
| 3,746,430 | 7/1973 | Brean et al. | 359/604 |
| 3,807,832 | 4/1974 | Castellion | 359/267 |
| 3,811,046 | 5/1974 | Levick | 250/206 |
| 3,813,540 | 5/1974 | Albrecht | 250/214 RC |
| 3,862,798 | 1/1975 | Hopkins | 359/38 |
| 3,962,600 | 6/1976 | Pittman | 315/158 |
| 3,986,022 | 10/1976 | Hyatt | 250/203 |
| 4,161,653 | 7/1979 | Bedini et al. | 250/215 |
| 4,200,361 | 4/1980 | Malvano et al. | 359/38 |
| 4,249,160 | 2/1981 | Chilvers | 340/902 |
| 4,266,856 | 5/1981 | Wainwright | 359/606 |
| 4,281,898 | 8/1981 | Ochiai et al. | 359/606 |
| 4,443,057 | 4/1984 | Bauer et al. | 359/606 |
| 4,491,390 | 1/1985 | Tong-Shen | 359/39 |
| 4,512,637 | 4/1985 | Ballmer | 359/275 |
| 4,529,275 | 7/1985 | Ballmer | 359/265 |

(List continued on next page.)

FOREIGN PATENT DOCUMENTS

| | | |
|---|---|---|
| 0426503A1 | 5/1991 | European Pat. Off. . |
| 0492591A1 | 7/1992 | European Pat. Off. . |
| 2513198 | 3/1983 | France . |
| 2133182 | 1/1973 | Germany . |
| 2808260A1 | 8/1979 | Germany . |
| 3041612C1 | 11/1980 | Germany . |
| 3041692A1 | 5/1981 | Germany . |
| 4118208A1 | 11/1991 | Germany . |
| 5630305 | 8/1979 | Japan . |
| 57-173801 | 10/1982 | Japan . |
| 57-208530 | 12/1982 | Japan . |
| 57-208531 | 12/1982 | Japan . |
| 58-19941 | 4/1983 | Japan . |

(List continued on next page.)

Primary Examiner—Thong Q. Nguyen
Attorney, Agent, or Firm—Fitzpatrick, Cella, Harper & Scinto

[57] ABSTRACT

A system apparatus, structure and method for controlling a plurality of variable reflectance mirrors (or mirror segments), including a rearview mirror and side view mirrors, which change their reflectance level in response to a plurality of drive voltages applied thereto, for an automotive vehicle. The system includes a light sensing device and a control circuit formed as a single VLSI CMOS circuit. The light sensing device comprises a photosensor array having a field of view encompassing a rear window area and at least a portion of at least one side window area of the vehicle. The logic and control circuit determines a background light signal from photosensor element signals generated by the photosensor elements in the photosensor array indicative of light levels incident on the photosensor elements. The circuit also determines a peak light signal in three different zones or sub-arrays of the photosensor array. The zones or sub-arrays may correspond to three mirrors or mirror segments. The peak light signals in each of the zones and a common background light signal are used to determine independent and separate control signals, which are then output to separate mirror drive circuits for independently controlling the reflectance level of the rearview mirror and the left and right side view mirrors, or alternatively the segments of a mirror.

87 Claims, 12 Drawing Sheets

U.S. PATENT DOCUMENTS

| | | | |
|---|---|---|---|
| 4,529,873 | 7/1985 | Ballmer et al. | 250/201.1 |
| 4,572,619 | 2/1986 | Reininger et al. | 359/254 |
| 4,580,875 | 4/1986 | Bechtel et al. | 359/604 |
| 4,603,946 | 8/1986 | Kato et al. | 359/38 |
| 4,614,415 | 9/1986 | Hyatt | 354/354 |
| 4,623,222 | 11/1986 | Itoh et al. | 359/38 |
| 4,629,941 | 12/1986 | Ellis et al. | 315/153 |
| 4,632,509 | 12/1986 | Ohmi et al. | 359/38 |
| 4,669,825 | 6/1987 | Itoh et al. | 359/38 |
| 4,669,826 | 6/1987 | Itoh et al. | 359/604 |
| 4,671,615 | 6/1987 | Fukada et al. | 359/38 |
| 4,672,457 | 6/1987 | Hyatt | 348/761 |
| 4,676,601 | 6/1987 | Itoh et al. | 359/38 |
| 4,690,508 | 9/1987 | Jacob | 359/38 |
| 4,697,883 | 10/1987 | Suzuki et al. | 359/604 |
| 4,701,022 | 10/1987 | Jacob | 359/603 |
| 4,727,290 | 2/1988 | Smith et al. | 315/82 |
| 4,741,603 | 5/1988 | Miyagi et al. | 359/270 |
| 4,793,690 | 12/1988 | Gahan et al. | 359/604 |
| 4,820,933 | 4/1989 | Hong et al. | 307/10.1 |
| 4,838,650 | 6/1989 | Stewart et al. | 359/604 |
| 4,886,960 | 12/1989 | Molyneux et al. | 250/206 |
| 4,896,030 | 1/1990 | Miyaji | 250/206 |
| 4,916,374 | 4/1990 | Schierbeek et al. | 318/483 |
| 4,917,477 | 4/1990 | Bechtel et al. | 359/267 |
| 4,956,591 | 9/1990 | Schierbeek et al. | 318/483 |
| 4,991,054 | 2/1991 | Walters | 361/165 |
| 5,012,082 | 4/1991 | Watanabe | 250/208.2 |
| 5,055,668 | 10/1991 | French | 250/208.2 |
| 5,064,274 | 11/1991 | Alten | 359/604 |
| 5,148,014 | 9/1992 | Lyman et al. | 359/602 |
| 5,168,378 | 12/1992 | Black et al. | 359/38 |
| 5,193,029 | 3/1993 | Schofield et al. | 359/604 |
| 5,204,778 | 4/1993 | Bechtel | 359/604 |

FOREIGN PATENT DOCUMENTS

| | | |
|---|---|---|
| 61-56638 | 4/1986 | Japan . |
| 61-54942 | 4/1986 | Japan . |
| 3284413 | 12/1991 | Japan . |
| 417386 | 4/1992 | Japan . |
| 1535182 | 12/1978 | United Kingdom . |
| 2029343 | 3/1980 | United Kingdom . |
| 2119087 | 11/1983 | United Kingdom . |
| 2137373 | 10/1984 | United Kingdom . |
| 2156295 | 10/1985 | United Kingdom . |
| 59-51325 | 4/1984 | Japan . |
| 59-51301 | 4/1984 | Japan . |
| 60-212730 | 10/1985 | Japan . |
| 60-166651 | 11/1985 | Japan . |

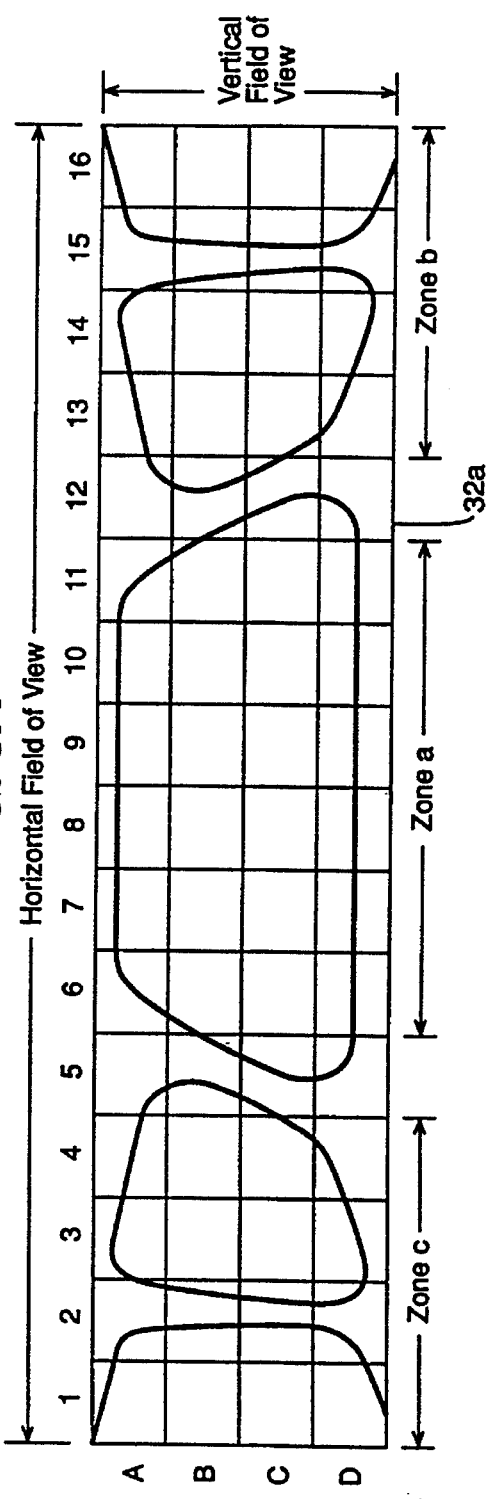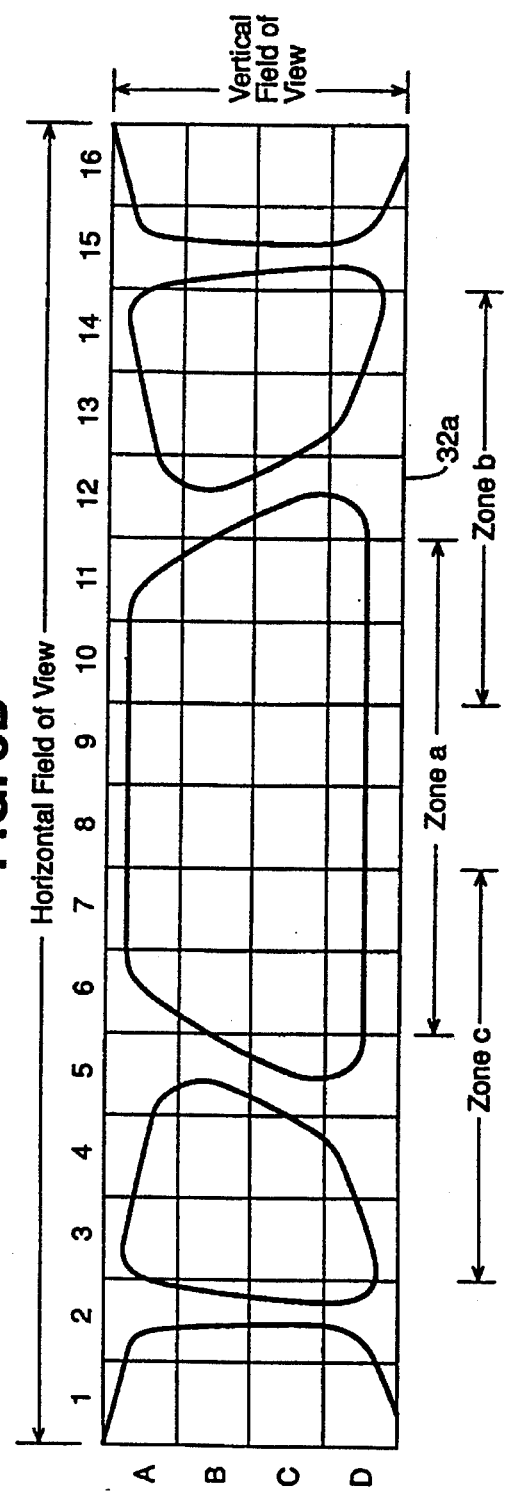

AUTOMATIC REARVIEW MIRROR SYSTEM USING A PHOTOSENSOR ARRAY

BACKGROUND OF THE INVENTION

1. Field of the Invention

This invention relates to an automatic rearview mirror system for automotive vehicles which automatically changes reflectance level in response to glare causing light, and more particularly relates to an improved automatic rearview mirror system using only a rearwardly facing sensor.

2. Description of Related Art

Automatic rearview mirrors and mirror systems have been devised for varying the reflectance level of a variable reflectance rearview mirror by reducing the reflectance automatically in response to annoying glare light, as seen rearwardly of the rearview mirror or mirrors by a driver of the vehicle, and by increasing automatically the reflectance to a normal or maximum reflectance level when the annoying glare light subsides. These automatic mirrors have been changed over the years in an effort to improve their performance characteristics and associated level of glare protection.

Early automatic rearview mirrors used a rearwardly facing sensor and control circuit to change mirror reflectance. One example of such a "single-sensor" type mirror is described in U.S. Pat. No. 4,266,856. In these prior art single-sensor type mirrors, the rear glare light was incident on a rearwardly facing sensor or photocell, such as a photodiode, photoresistor or phototransistor. These mirrors suffered from various problems, however, including the problem that these mirrors would become increasingly sensitive and even "lock-up" in their minimum reflectance level or state as the driver encountered significantly higher light levels in town or city driving. This required the driver to repeatedly adjust the mirror's sensitivity control to prevent such problems.

To overcome the problems of single-sensor type mirrors, a non-rearwardly facing photocell for sensing "ambient" light was added. It was believed that the desired reflectance necessary to relieve the driver from glare depended not only on glare light but also on ambient light. Accordingly, these "two-sensor" type mirrors used two separate photocells, one generally facing rearwardly and one generally facing forwardly (or other non-rearwardly facing direction) of the mirror or vehicle. The signals from these two photocells were then compared in some fashion, and when, for example, the glare light from the rear was comparatively high with respect to the "ambient" light, a control circuit would apply a control signal to reduce mirror reflectance. Some examples are described in German Laid-Open Patent No. 3,041,612; Japanese Laid-Open Patent No. 58-19941; and U.S. Pat. Nos. 3,601,614; 3,612,666; 3,680,951; 3,746,430; 4,443,057; 4,580,875; 4,690,508; and 4,917,477. In many of these prior art automatic rearview mirrors, light generally forward of the mirror or vehicle was incident on the second photocell.

These arrangements, however, also had problems. In some of these mirrors the forwardly facing or "ambient" light sensor was inaccurate because it did not correctly measure ambient light levels since it did not include light generally rearward of the mirror or vehicle. Some examples include the devices described in U.S. Pat. Nos. 4,443,057 and 4,917,477. Other prior art devices overcame these deficiencies by providing a control circuit which correctly measured ambient light as a combination of both the forward and rear light levels. Examples of this significantly different approach are described in U.S. Pat. Nos. 4,793,690 and 4,886,960.

The prior art two-sensor type systems generally provided improved performance over prior art single-sensor type systems but were also more complex and costly. In part, this was because using separate forwardly and rearwardly facing photocells required that the performance characteristics of the two separate photocells, such as photoresistors, be matched appropriately to ensure consistent performance under various operating conditions. Matching photocells such as photoresistors, however, generally involves complex, expensive and time consuming operations and procedures.

Both the prior art single-sensor and two-sensor type mirrors presented additional problems when they were also used to control the exterior side view mirrors. This is because such prior art systems used a common control or drive signal to change the reflectance level of both the interior rearview mirror and the exterior left and/or right side view mirrors by substantially the same amount. In U.S. Pat. No. 4,669,826, for example, a single-sensor type mirror system used two rearwardly facing photodiodes to control both an interior rearview mirror and the left and/or right side view mirrors based on the direction of incident light from the rear. Another example includes the two-sensor type system described in U.S. Pat. No. 4,917,477.

In rearview mirror systems, however, each of the interior rearview and exterior side view mirrors may reflect different source light levels. More specifically, the inside rearview mirror, left side view mirror and right side view mirror each enable the driver to view a different portion or zone of the total rearward area. Of course, there may be some overlap of the image information contained in each of the three zones. The situation is further complicated with multi-lane traffic because each of the mirrors reflects different light levels caused by the headlights of the vehicles which are following, passing or being passed. As a result, in the prior art systems, when the reflectance level of the interior rearview mirror was reduced to decrease the glare of headlights reflected therein, the reflectance level of the exterior left and right side view mirrors was also reduced by substantially the same amount, even though, for example, the side view mirrors might not be reflecting the same level of glare light, if any. Accordingly, rear vision in the exterior left and right side view mirrors could be improperly reduced.

Other prior art two-sensor type systems used a common ambient light sensor and several rearwardly facing sensors, one for each of the mirrors. An example is the alternate system also described in U.S. Pat. No. 4,917,477. This approach is not satisfactory, however, because it reduces system reliability and increases complexity and cost.

Finally, some prior anti-glare mirrors used several sensors to control the segments of a variable reflectance mirror. One example is disclosed in U.S. Pat. No. 4,632,509, which discloses a single-sensor type mirror using three rearwardly facing photocells to control three mirror segments depending on the direction of incident light from the rear. See also U.S. Pat. No. 4,697,883. These prior mirror systems generally have the same problems as the other single-sensor type mirrors. Some other anti-glare mirrors are generally disclosed in U.S. Pat. Nos. 3,986,022; 4,614,415; and 4,672,457.

Consequently, there is a need for an automatic rearview mirror system for an automotive vehicle having improved reliability and low cost, which accurately determines or otherwise discriminates light levels that the driver will experience as glare without the need for a separate forwardly facing photocell. In addition, as noted above, there is also a need for an automatic rearview mirror system of high reliability and low cost, which accurately determines light levels that the driver will experience as glare, and which can control independently the reflectance of a plurality of mirrors according to the light levels actually reflected by each of the rearview and exterior side view mirrors without the need for additional and separate rearwardly facing photocells. There is also a need for an automatic rearview mirror system that can independently control the segments of a variable reflectance mirror while accurately determining light levels that the driver will experience as glare in each segment of the mirror without the need for additional and separate forwardly and rearwardly facing photocells.

SUMMARY OF THE INVENTION

It is an object of the present invention to overcome the problems of the prior art.

It is another object of the present invention to provide an automatic rearview mirror system of improved reliability.

It is yet another object of the present invention to provide an automatic rearview mirror system that accurately determines light levels that the driver will experience as glare without the need for a separate forward facing sensor or other non-rearwardly facing photocells.

It is another object of the present invention to provide an automatic rearview mirror system of high reliability that accurately determines light levels that the driver will experience as glare, and which can independently control a plurality of mirrors or mirror segments according to different fields of view without the need for additional and separate rearwardly facing photocells.

According to one aspect of the present invention, using a photosensor array and an appropriate control circuit allows the elimination of separate forwardly facing or other non-rearwardly facing photocells, thereby allowing for lower costs and increased reliability since it is not necessary to match two separate photocells such as photoresistors.

According to another aspect, the present invention which achieves one or more of these objectives relates to a control system for controlling a plurality of variable reflectance mirrors or mirror segments which change their reflectance in response to a signal from a drive circuit. The system comprises a plurality of variable reflectance mirrors, a photosensor array and a control circuit receiving signals from the photosensor array for controlling the mirrors. The photosensor array is mountable to view rearwardly of the mirror or vehicle. The photosensor array comprises a plurality of sets of photosensor elements corresponding to the plurality of variable reflectance mirrors. The photosensor elements in each set produce a plurality of photosensor element signals in response to light incident thereon. The control circuit determines control signals, indicative of a desired reflectance for each of the plurality of variable reflectance mirrors, in response to receiving photosensor element signals from the photosensor element set for each view or zone corresponding to the rearview mirror and exterior side view mirrors and also (or alternatively) the mirror segments. The control signals control the drive circuit to cause the plurality of variable reflectance mirrors or mirror segments to assume the desired reflectance.

According to another aspect, the present invention which achieves one or more of these objectives relates to an automatic rearview mirror system for an automotive vehicle comprising at least one variable reflectance rearview mirror, and an array of sensing elements to sense light levels in an area rearward of the at least one variable reflectance rearview mirror. Each of the sensing elements is adapted to sense light levels of light incident thereon and to output an electrical signal indicative of the sensed light levels. The system further comprises a signal processor, connected to the array of sensing elements, receiving and using the electrical signals indicative of the sensed light levels from the sensing elements to determine a first electrical signal indicative of a background light level in the area rearward of the at least one variable reflectance rearview mirror and to determine a second electrical signal indicative of at least one peak light level in the area rearward of the at least one variable reflectance rearview mirror. The signal processor determines at least one control signal indicative of the desired reflectance level of the at least one variable reflectance rearview mirror from the first electrical signal indicative of the background light level and the second electrical signal indicative of the at least one peak light level. The system further comprises at least one drive circuit connected to the signal processor and to the at least one variable reflectance rearview mirror for receiving the at least one control signal and generating and applying at least one drive signal to the at least one variable reflectance rearview mirror to drive the at least one variable reflectance mirror to the desired reflectance level.

According to another aspect, the present invention which achieves one or more of these objectives relates to a control system for controlling a plurality of variable reflectance mirrors, each of which change their reflectance level in response to a drive signal from an associated drive circuit, for an automotive vehicle. The system comprises a plurality of variable reflectance mirrors, and a photosensor array mountable to face substantially towards a rear area. The photosensor array comprises a plurality of photosensor element sets. Each set comprises a plurality of photosensor elements. Each of the photosensor elements generates a photosensor element signal indicative of a light level of light incident thereon, and each of the sets corresponds to one of the plurality of variable reflectance mirrors. The system further comprises a control circuit, connected to the photosensor array, for determining and applying a plurality of control signals. Each of the control signals is indicative of a desired reflectance level for each of the plurality of variable reflectance mirrors in response to receiving the photosensor element signals from each of the plurality of photosensor element sets. The system further comprises a plurality of drive circuits connected to the control circuit and to different ones of the plurality of variable reflectance mirrors associated therewith. Each of the control signals is output to the drive circuit associated therewith, to generate and apply a drive signal to each of the plurality of variable reflectance mirrors causing each of the mirrors to assume a desired reflectance level.

According to another aspect, the present invention which achieves one or more of these objectives relates to a control system for controlling at least one variable reflectance mirror for an automotive vehicle. The system comprises photosensor array means for sensing light levels in an area rearward of the at least one variable reflectance mirror and generating photosensor array signals, means for determining a background light signal from the photosensor array signals, means for determining a peak light signal from the photosensor array signals, and means for controlling a reflectance level of the at least one variable reflectance mirror using the background and peak light signals.

According to another aspect, the present invention which achieves one or more of these objectives relates to a method of controlling the reflectance of at least one variable reflectance mirror comprising the steps of sensing light levels in an area rearward of the at least one variable reflectance mirror with an array of sensing elements, determining a background light level from the sensed light levels, determining a peak light level from the sensed light levels, and controlling a reflectance level of the at least one variable reflectance mirror using the determined background and peak light levels.

By using a plurality of photosensor element sets or sub-arrays on a photosensor array to control a plurality of mirrors and also (or alternatively) mirror segments, the mirrors may be controlled independently to vary their reflectance in accordance with the view associated with each of the photosensor element sets or sub-arrays.

These and other objects, advantages and features of the present invention will be readily understood and appreciated with reference to the detailed description of preferred embodiments discussed below together with the accompanying drawings.

BRIEF DESCRIPTION OF THE DRAWINGS

FIGS. 3A and 3B are illustrative diagrams of a rearward area as viewed by the photosensor elements of the photosensor array;

DETAILED DESCRIPTION OF PREFERRED EMBODIMENT

I. The Automatic Rearview Mirror system

Figure 1A:
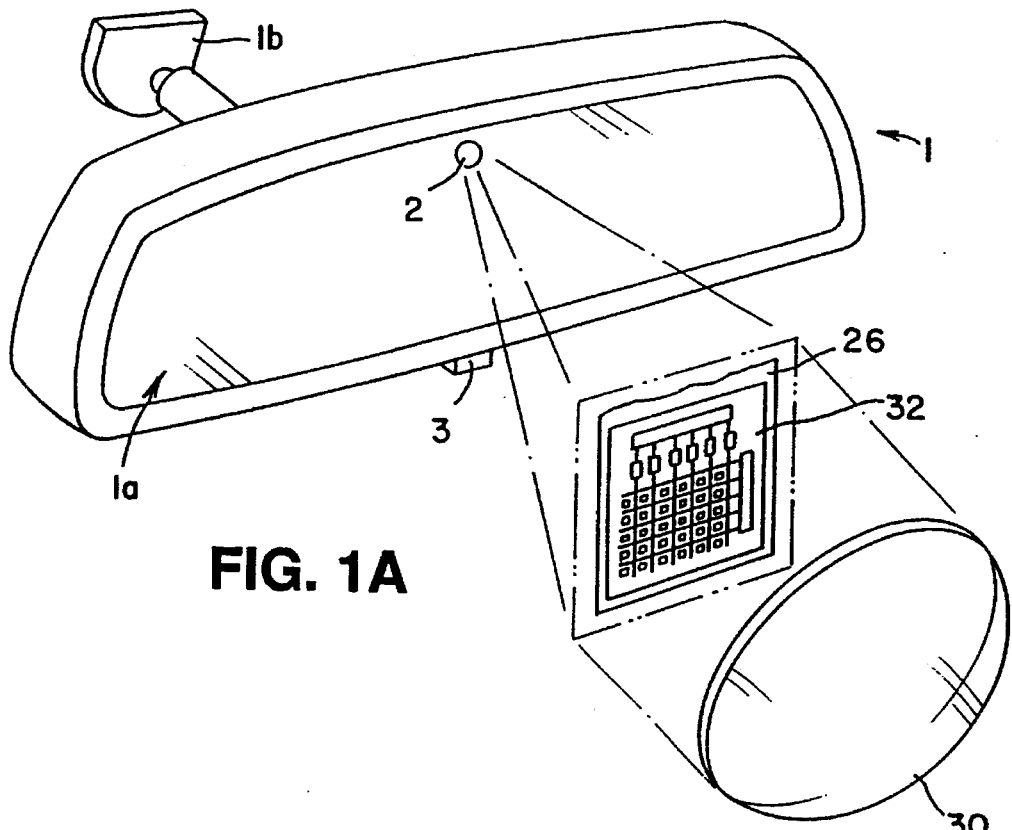
FIG. 1A is a drawing of an automatic rearview mirror of the present invention, including an expanded view of a rearwardly facing photosensor array located in the upper center area of the mirror surface.

FIG. 1A illustrates an automatic rearview mirror 1 comprising a variable reflectance mirror element 1a and a single rearwardly facing photosensor 2. The photosensor 2 is mounted facing rearwardly of the rearview mirror 1 so that its field of view encompasses an area comprising a rear window area and at least a portion of either or both side window areas. Also shown is a switch 3 to allow a driver to manually control several possible mirror functions, such as an on-off control switch, a sensitivity adjustment and a force-to-day or a force-to-night switch (i.e., forced maximum or minimum reflectance levels, respectively). An expanded view of the photosensor 2, which is preferably located in an upper center area of the variable reflectance mirror element 1a as shown, shows a light sensing and logic circuit 26 comprising a photosensor array 32 and a logic and control circuit 34 (which is not shown in FIG. 1A but is shown in FIG. 6 as discussed below). A photosensitive surface of each of the photosensor elements 32a (shown in FIG. 5) of the photosensor array 32 senses light levels or image information in a predetermined field of view encompassing an area located rearwardly of the rearview mirror 1. A lens 30 images or otherwise focuses the light information from the predetermined field of view onto the photosensor array 32.

The rearview mirror 1 further comprises a channel mount 1b or other mounting means used to fixedly attach the mirror 1 to the windshield or headliner area of the vehicle. The rearview mirror 1 is generally adjustable with respect to the channel mount 1a to allow a driver to position the mirror for correct viewing of the rearward area or scene so that the driver's sightline through the rearview mirror 1 is aligned approximately with the vehicle's centerline.

Figure 1B:
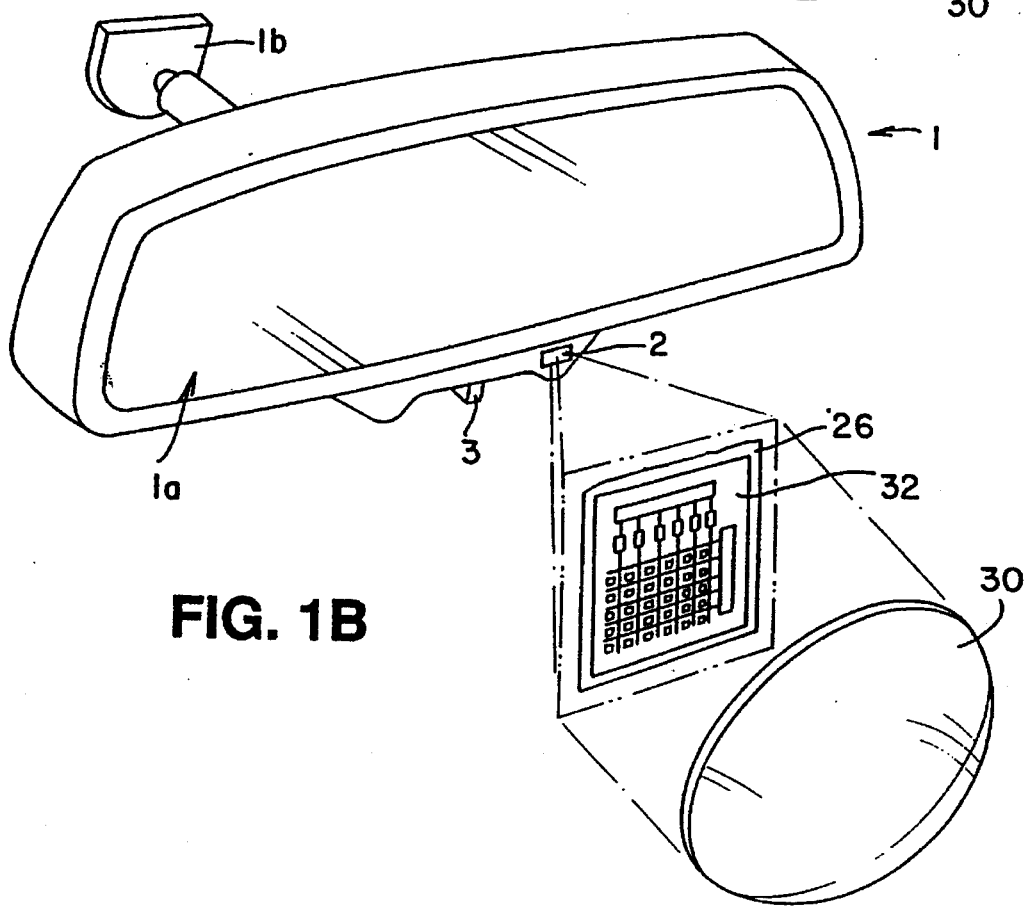
FIG. 1B is another drawing of an automatic rearview mirror of the present invention, including an expanded view of the rearwardly facing photosensor array alternatively located in a bezel or chin of the mirror.

Preferably, the photosensor 2 is fixedly mounted on the adjustable portion of the rearview mirror 1 as shown in both FIGS. 1A and 1B so that the viewing axis of the photosensor 2 is generally aligned with the viewing axis of the mirror 1 which is perpendicular to the glass surface of the mirror 1. This approach is preferable both because of packaging concerns and because it provides a guaranteed sightline. It is, however, within the scope of the present invention to mount the photosensor array 32 so that it is movable with respect to the variable reflectance mirror element 1a of the rearview mirror 1.

More preferably, as shown in FIG. 1A, the photosensor 2 is located in the upper center area of the variable reflectance mirror element 1a. This may be required, for example, if it is necessary to reduce the bezel size of the rearview mirror 1. If the photosensor 2 is located behind a glass surface of the variable reflectance mirror element 1a, an appropriately sized hole is provided in the protective and reflective materials of the variable reflectance mirror element 1a. Additionally, a corresponding area within an active layer of the variable reflectance mirror element 1a may be removed or otherwise rendered inactive to enable the photosensor 2 to view directly the rearward scene. Alternatively, for manufacturing reasons, the photosensor 2 may view the rearward scene through the active layer of the variable reflectance mirror element 1a, in which case it is preferable to compensate for or otherwise negate the effects of reducing reflectance and correspondingly the transmittance of the variable reflectance mirror element 1a so that the photosensor 2 effectively views the rearward scene directly as will be described later.

Most preferably, a reflective surface is maintained within the hole to both preserve the cosmetic appearance of the assembly as viewed by the driver and to maximize the reflective surface. This can be achieved by providing a very thin metal reflective layer (100 Å thickness or lower) of aluminum, stainless steel, chromium, or silver, etc., so as to be sufficiently transmitting for incident light to enable proper operation of the photosensor array 32 but also sufficiently reflective to appear mirror-like in the area of the hole. Alternatively, a reflective tape, which is both sufficiently transmitting and reflective to achieve the objectives described herein, may be adhered at the hole region using suitable means such as an optical adhesive and the photosensor array 32 may then be mounted behind the optical adhesive. Additionally, thin film stacks such as a solid state tri-layer of ¼ wave $TiO_2$, ¼ wave $SiO_2$ and ¼ wave $TiO_2$ or some other single thin film of a high index material may be mounted behind or coated upon the area of the hole. Finally, since the preferred photosensor array 32 is responsive to both visible light and near infrared, it is preferable to select a material which reflects a significant proportion of visible light while being essentially transparent to infrared.

As shown in FIG. 1B, the photosensor 2 may also be located in the bezel or chin of the rearview mirror 1 to view the rearward area directly without any compensation. Although not shown, the photosensor 2 may also be located on or near the channel mount 1b so that the axis of the photosensor 2, which is perpendicular to the plane of the photosensor array 32, is in fixed alignment with the vehicle's centerline regardless of the adjusted position of the rearview mirror 1.

For other vehicles, such as trucks, the photosensor 2 may also be located with each of the external side view mirrors as will be described later.

The lens 30 is preferably a single molded plastic lens approximately 2 millimeters in diameter and is preferably bonded to or in close contact with the photosensor array 32. The lens 30 may, however, include any appropriate image focusing means such as conventional single component optics, holographic lens type optics, binary optics or a microlens. The lens 30 preferably is also designed to focus an image of the rearward scene within a field of view defined by a cone. The cone's centerline is perpendicular to the plane of the photosensor array 32 and the cone preferably has an included angle of approximately 100 degrees. Thus, the image is focused onto a circular area of the plane of the photosensor array 32. Of course, the photosensor array 32 could be positioned in other than a rearwardly facing direction so long as appropriate lenses or other optics are used to direct the light or image information from the rearward area onto the photosensitive surface of the photosensor array 32.

The pre-positioning of the photosensor array 32 in the rearview mirror 1 depends on whether the automatic rearview mirror system 20 is being used in a left hand or a right hand drive vehicle. In either case, the photosensor array 32 is preferably pre-positioned within the circular area of the focused image so that for either a left or right hand drive vehicle and with only driver adjustment of the rearview mirror 1, the rearward scene imaged onto the photosensitive surface of the photosensor array 32 includes the rear window area and at least a portion of the left and right side window areas of the vehicle.

If a sufficiently large photosensor array 32 is used, then the pre-positioning of the photosensor array 32 is not vehicle specific as described above, and a system 20 using a larger photosensor array 32 may be used for both left and right hand drive vehicles. The larger photosensor array 32 is positioned symmetrically within the circular area of the focused image described above. Using the larger photosensor array 32 involves using a pattern recognition means to determine the approximate vehicle centerline so that the appropriate portion of the larger photosensor array 32 may be selected depending on whether the automatic rearview mirror system 20 is installed in a left or right hand drive vehicle.

Figure 2:
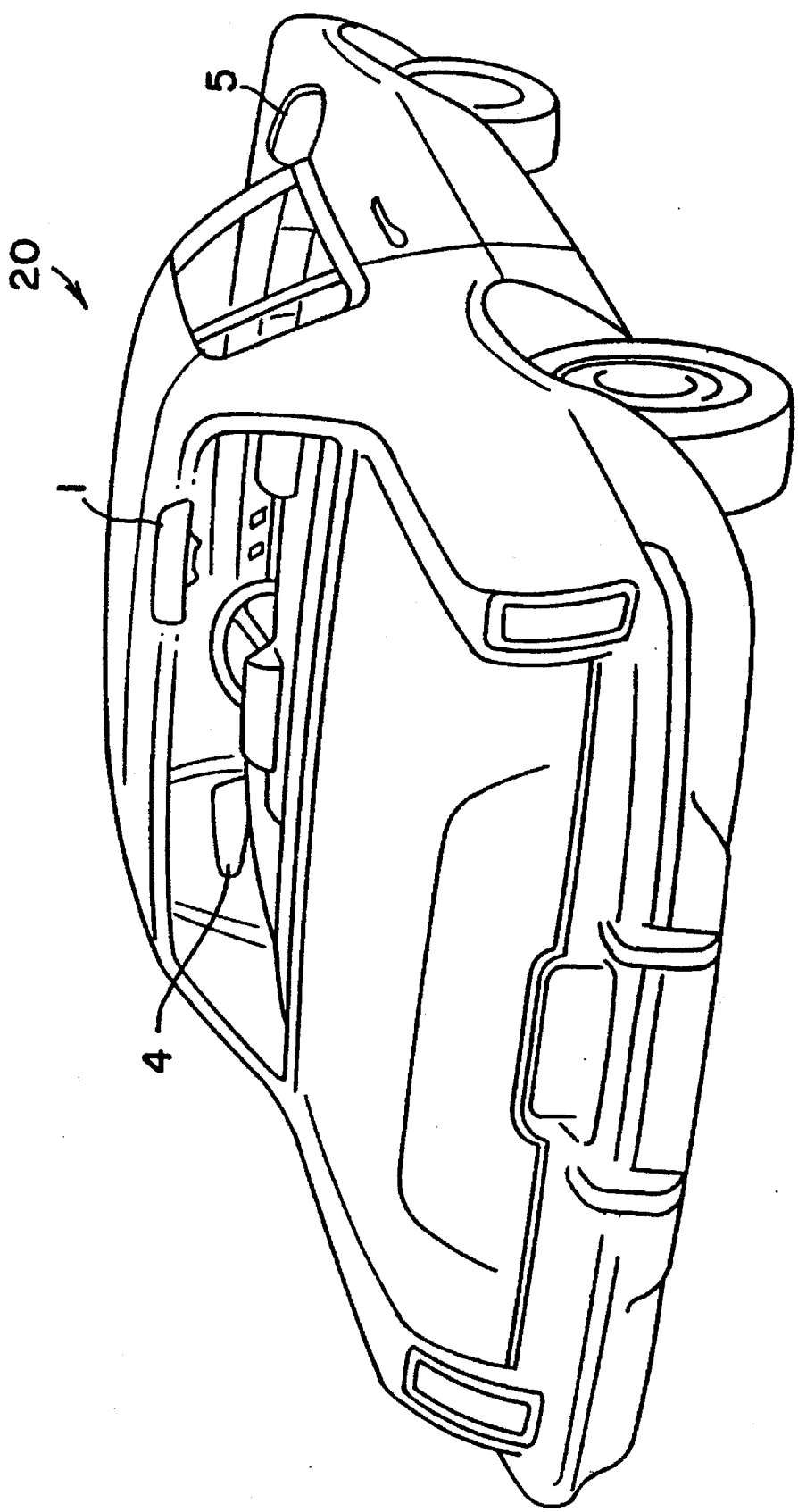
FIG. 2 is a drawing of an automotive vehicle with the automatic rearview mirror system of the present invention.

FIG. 2 illustrates an automatic rearview mirror system 20 for an automotive vehicle, comprising the rearview mirror 1, a left side view mirror 4 and a right side view mirror 5. As will be discussed below, either or both of the side view mirrors 4 and 5 may be connected to a control circuit of the rearview mirror 1. The mirrors 1, 4 and 5 may be constructed according to any of the methods known to those skilled in the art and are generally constructed according to the styling preferences and specifications of the automotive vehicle manufacturers. The means for mounting the rearview mirror 1, such as the channel mount 1b, and the electrical connectors used to connect the mirrors 4 and 5 to the control circuit of the rearview mirror 1 and the vehicle's electrical system may include any one of the many configurations known to those having ordinary skill in the art. The variable reflectance mirror element 1a of the mirrors 1, 4 and 5 may be any device having more than one reflectance level corresponding to a specific control or drive signal. Preferably, however, the variable reflectance mirror element 1a is an electrochromic mirror.

As discussed, the photosensor 2 is mounted facing rearwardly of the rearview mirror 1 so that its field of view encompasses an area comprising the rear window area and at least a portion of both the left side window area and the right side window area. The horizontal and vertical fields of view of the rearward area as seen by the photosensor 2, and more particularly by the photosensor array 32, are illustratively shown in FIGS. 3A and 3B.

As shown in FIG. 3A, the photosensor array 32 senses a field of view divided into three separate zones: a center zone a, a left zone b (generally corresponding to the left side window area) and a right zone c (generally corresponding to the right side window area). Each zone is sensed by a separate set or sub-array S(X) of photosensor elements 32a (described with respect to FIGS. 4A and 4B) within the photosensor array 32. The center zone, zone a, generally receives light from the rear window area of the vehicle. This rear window area is depicted by a trapezoidally shaped rear window figure superimposed on a first set or sub-array S(1) of photosensor elements 32a used to sense light levels in zone a. Zone b includes light from at least a portion of a left side window area. This is depicted by a trapezoidally shaped left rear side window figure and a partially shown left front side window figure superimposed on a second set or sub-array S(2) of photosensor elements 32a used to sense light levels in zone b. Similarly, zone c includes light from at least a portion of a right side window area. This is depicted by a trapezoidally shaped right rear side window figure and a partially shown right front side window figure superimposed on a third set or subarray S(3) of photosensor elements 32a used to sense light levels in zone c. Additionally, all three zones include light reflected from whatever fixed body work and interior trim, head rests, vehicle occupants or other objects that are within the zones a, b and c.

Also as illustratively shown in FIG. 3A, the photosensor elements 32a in columns 1 to 4 comprise the third photosensor element set in zone c, the photosensor elements 32a in columns 6–11 comprise the first photosensor element set in zone a and the photosensor elements 32a in columns 13 to 16 comprise the second photosensor element set in zone b. Null zones are provided between the zones a and b and between the zones a and c to allow for driver adjustment of the rearview mirror 1. These null zones also ensure that the center zone a does not include light or other image information from the side window areas of zones b and c.

As will be discussed in more detail below, the logic and control circuit 34 selects photosensor element signals from the first photosensor element set or subarray S(1) (shown in FIG. 4B) corresponding to zone a to control the reflectance level of the rearview mirror 1. Similarly, the control circuit 34 selects photosensor element signals from the second photosensor element set or sub-array S(2) (shown in FIG. 4B) corresponding to zone b to control the reflectance level of the left side view mirror 4, and further selects photosensor element signals from the third photosensor element set or sub-array S(3) (shown in FIG. 4B) corresponding to zone c to control the reflectance level of the right side view mirror 5. Additionally, for a variable reflectance mirror element 1a having segments, such as a center, left and right segment, appropriately defined zones a, b and c, i.e., sub-arrays S(1), S(2) and S(3), corresponding to the mirror segments may be used by the logic and control circuit 34 to control independently the individual mirror segments.

FIG. 3B illustratively shows the preferred embodiment for the zones of the photosensor array 32. In this embodiment, the logic and control circuit 34 selects photosensor element signals from three overlapping sets or sub-arrays S(1), S(2) and S(3) of photosensor elements 32a corresponding to the three overlapping zones a, b and c to control, respectively, the reflectance level of the mirrors 1, 4 and 5. More specifically, the control circuit 34 selects photosensor element signals from the photosensor elements 32a in columns 6 to 11 (zone a) to control the reflectance level of the rearview mirror 1. The control circuit 34 also selects photosensor element signals from photosensor elements 32a in columns 10 to 14 (zone b) to control the reflectance level of the left side view mirror 4, and further selects photosensor element signals from photosensor elements 32a in columns 3 to 7 (zone c) to control the reflectance level of the right side view mirror 5.

Additionally, in the FIG. 3B embodiment, the lens 30 focuses or images light information from: (1) the rear window area onto zone a; (2) at least a portion of the rear window and left side window areas onto zone b; and (3) at least a portion of the rear window and right side window areas onto zone c. Contrastingly, in the FIG. 3A embodiment, the lens 30 focuses light from: (1) the rear window area onto zone a; (2) the left side window area onto zone b; and (3) the right side window area onto zone c. The overlapping zones in the FIG. 3B embodiment are advantageous because each set of overlapping photosensor elements 32a in zones a and b and each set of overlapping photosensor elements 32a in zones a and c, as well as the logic and control circuit 34, is able to "preview" the light information that may, for example, first appear in the rear window area (and correspondingly in the rearview mirror 1), but which may appear shortly thereafter in the left or right side view mirrors 4 and 5. By examining at least a portion of the rear window area, the automatic rearview mirror system 20 is able to more quickly respond to annoying glare light from approaching vehicles or other sources. Overlapping zones are also generally preferred because a glare light source located in a common or overlapping area of the rearview mirror 1 and one of the side view mirrors 4 or 5 can influence both mirrors.

II. The Light Sensing Device

Figure 5:
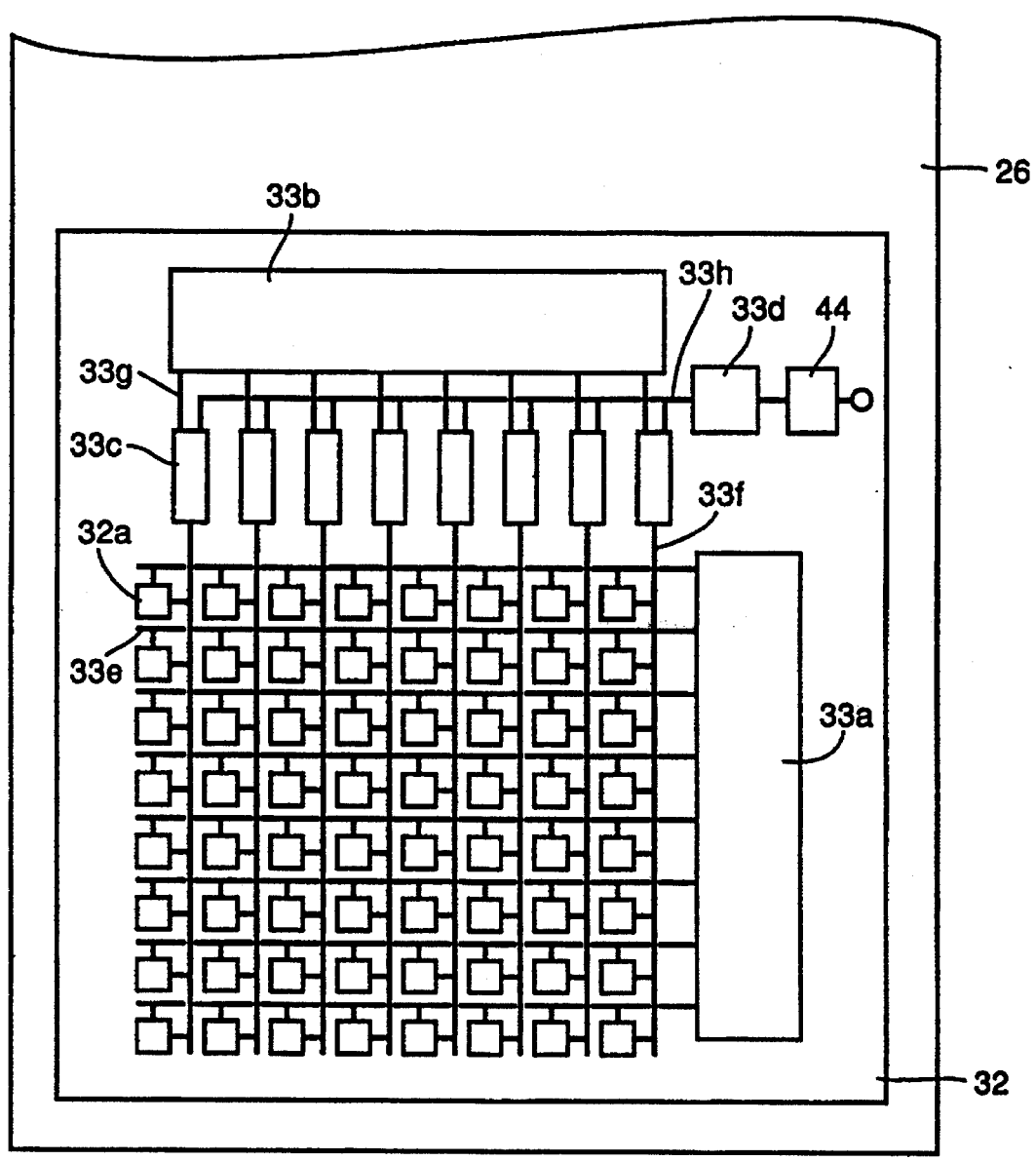
FIG. 5 is another schematic diagram of the photosensor array commonly located on a light sensing and logic circuit.
Figure 6:
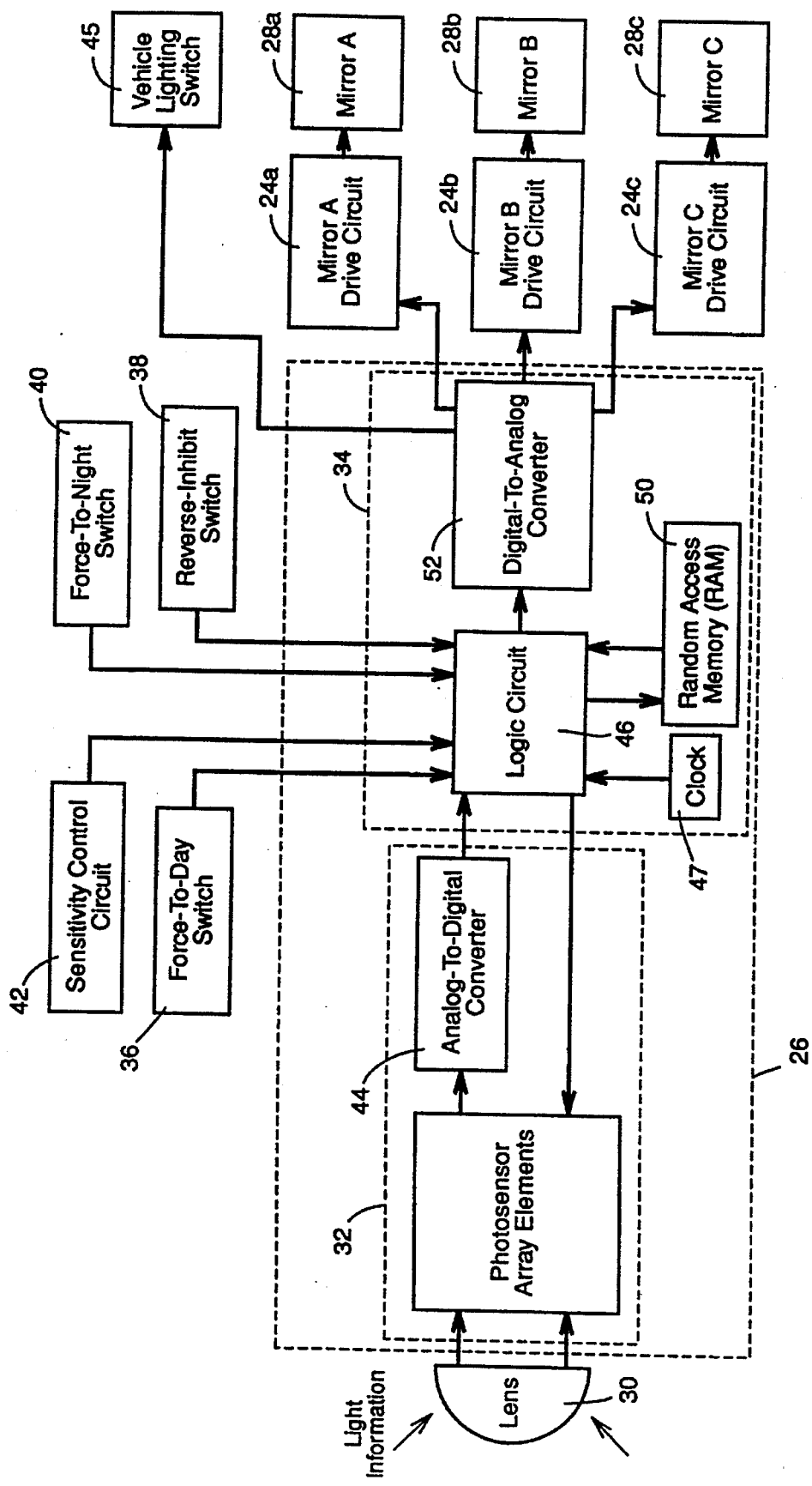
FIG. 6 is a schematic block diagram of the automatic rearview mirror system.

The light sensing device of the light sensing and logic circuit 26 is preferably the photosensor array 32 shown in FIG. 5. The photosensor array 32 has sufficient resolution to view the real image of a scene but may also use a spatial distribution of light intensities as an approximation of the imaged scene. An example of such a photosensor array is the VLSI Vision Limited (VVL) Single Chip Video Camera Model #ASIS 1011.

Since a photosensor array 32 of the type described, namely a VVL Single Chip Video Camera, is capable of providing image information having sufficient resolution for displaying an actual image or for some other purpose, it will be readily understood that additional features or functions may be incorporated by adding circuitry to provide video output from the photosensor array 32 in addition to the primary control functions described herein. For example, the video output may be output to a CRT, flat LC panel display or other appropriate display device, located within the vehicle, to provide a display of the imaged scene for viewing by the driver.

The photosensor array 32 may be located in any of the mirrors 28 or in any other appropriate location, whether local or remote, such as on the vehicle's rear bumper, thereby extending significantly the effective field of view normally available to the driver either directly or through the vehicle's mirrors 28. Additionally, the photosensor array 32 may even replace one or more of the side view mirrors 4 and 5 of the automatic rearview mirror system 20, thereby reducing the aerodynamic drag on the vehicle while providing sufficient information to the driver comparable to that available through the side view mirrors 4 and 5.

A video signal from the photosensor array 32 may also be used by the logic and control circuit 34 to determine the presence of a vehicle or other object within the field of view of the photosensor array 32 to provide a visual signal warning such as through a display panel, or even an audible warning, based on certain parameters, such as distance and speed of the object. Additionally, if the photosensor array 32 is located in the rearview mirror 1, the video signal may be used to monitor the vehicle's interior to detect unauthorized intrusion into the vehicle. This may be achieved by providing electrical power to the mirror's logic and control circuit 34 from a vehicle power supply and by activating a vehicle intrusion monitoring mode when a signal indicates that the vehicle's door and trunk locks have been activated. The logic and control circuit 34 may be used to continuously monitor the image from the vehicle's interior thereby allowing detection of objects or persons moving within the vehicle, and if movement is detected, another signal from the logic and control circuit 34 may then activate an intrusion alarm.

It is, however, within the scope of the present invention for the light sensing device to comprise any similarly appropriate image or array sensor. When the light sensing and logic circuit 26 is formed as a very-large-scale-integrated (VLSI) complementary-metal-oxide-semiconductor (CMOS) device, as is known to those skilled in the art, the light sensing device will share a common semiconductor substrate with the logic and control circuit 34.

Preferably, for the described three mirror system, the photosensor array 32 comprises a plurality of photosensor elements 32a arranged in 160 columns and 40 rows (a 160×40 array) providing a horizontal field of view of approximately 100 degrees and a vertical field of view of approximately 30 degrees. As discussed, FIGS. 3A and 3B illustratively show a 16×4 photosensor array 32. The photosensor array 32 may, however, comprise any appropriately sized array having an appropriate field of view. For example, the field of view may be narrower when controlling the segments of only one mirror. Each photosensor element 32a is preferably about 10 microns square.

Figure 4A:
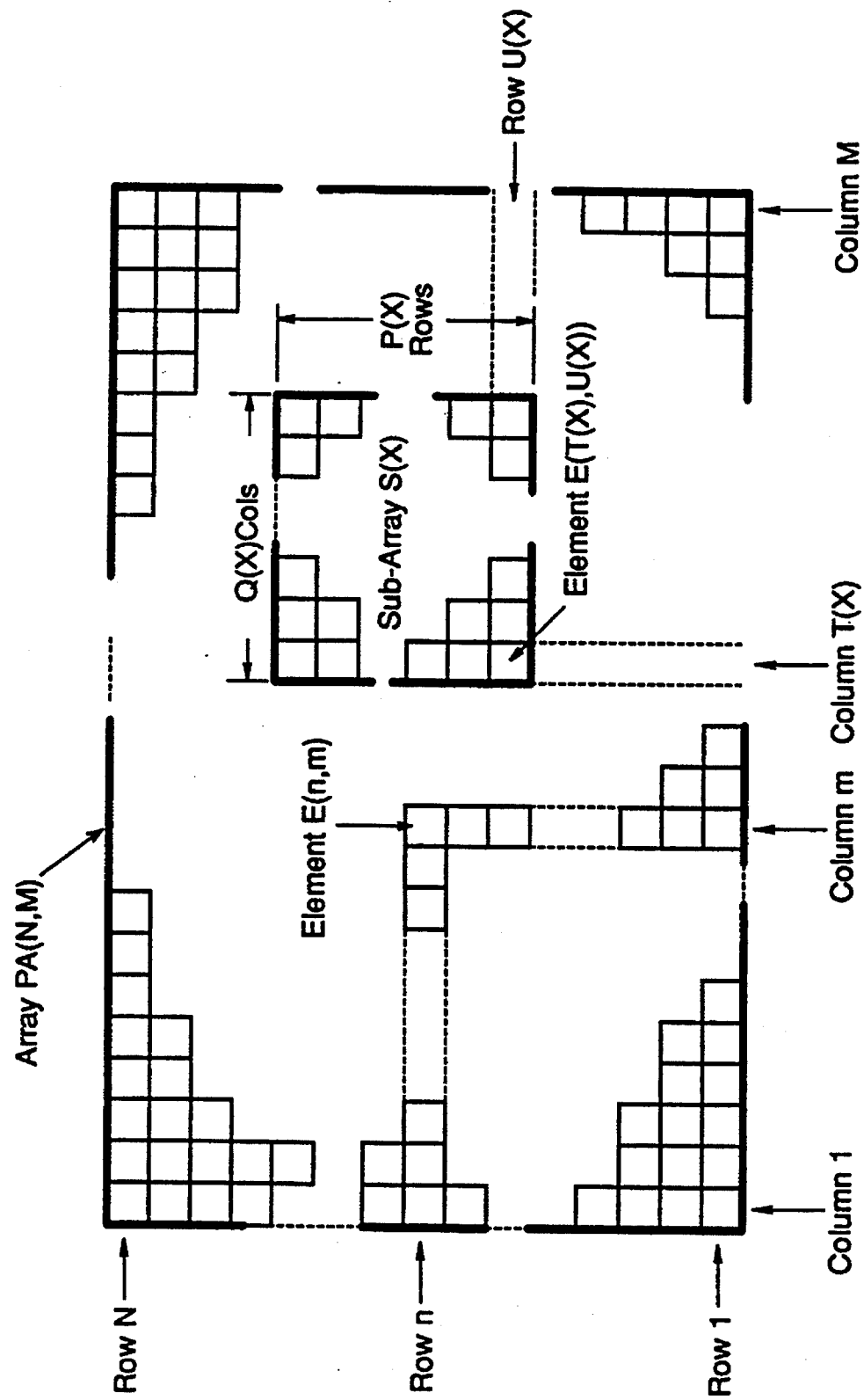
FIG. 4A is a generalized diagram of a photosensor array PA(N,M) having a sub-array S(X)

As shown in FIG. 4A, the photosensor array 32 generally comprises a plurality of photosensor elements 32a arranged in a photosensor array PA(N,M) having N rows of M columns. When viewing the photosensitive surface of the photosensor array PA(N,M) in a vertical plane, the lower row is row 1, the top row is row N, the left hand column is column 1, and the right hand column is column M. A specific photosensor element is identified as E(n,m) and the signal indicative of a light level incident thereon is L(n,m). Also, the sub-array S(X), where X=0, 1, 2, . . . , Z, is a rectangular array having P(X) rows of Q(X) columns of photosensor elements 32a and is located such that its lower left hand element is photosensor element E(T(X)), U(X)).

Figure 4B:
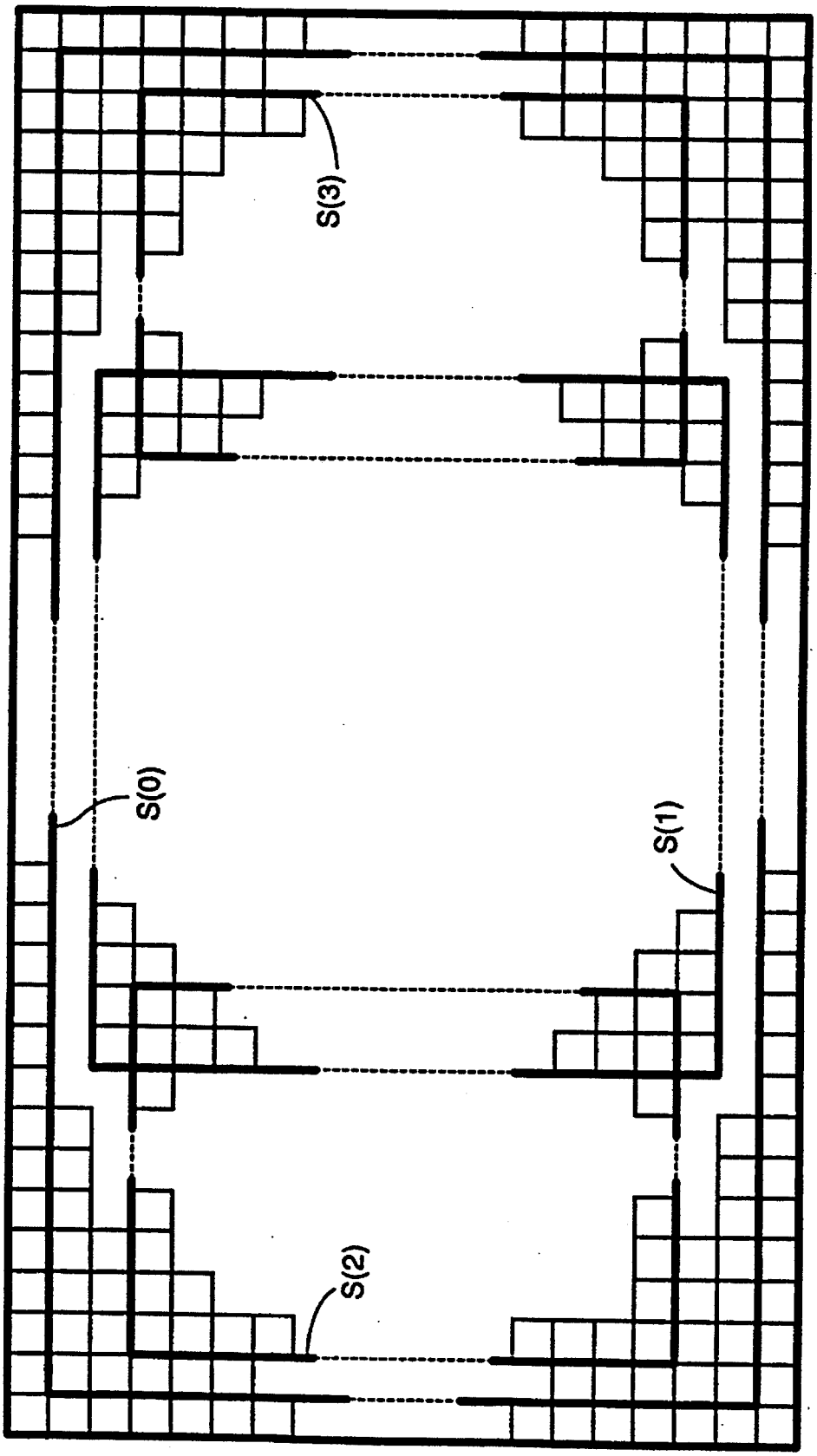
FIG. 4B is a generalized diagram of the photosensor array PA(N,M) and sub-arrays S(0), S(1), S(2) and S(3)

As shown in FIG. 4B, a background sub-array S(X) designated S(0) is used to determine a general background light level B. Signals from the photosensor elements 32a of each peak sub-array S(X), designated S(1), S(2) , . . . , S (Z), are used to determine a peak light level P(z) incident on each peak sub-array S(1), S(2) , . . . , S(Z). The general background light level B for background sub-array S(0) and the peak light level P(z) for each peak sub-array S(X) are then used to determine a mirror control signal $V_c(z)$ for controlling at least one mirror or mirror segments associated with each zone.

FIG. 5 generally illustrates a logic layout of the photosensor array 32. The logic and control circuit 34 generates array control signals to control the photosensor array 32. As is well known in the art, the photosensor array 32 is typically accessed in scan-line format, with the array 32 being read as consecutive rows, and within each row as consecutive columns or pixels. Each photosensor element 32a is connected to a common word-line 33e. To access the photosensor array 32, a vertical shift register 33a generates word-line signals for each word-line 33e to enable each row of photosensor elements 32a. Each column of photosensor elements 32a is connected to a bit-line 33f which is connected to a charge-to-voltage amplifier 33c. As each word-line 33e is accessed, a horizontal shift register 33b uses a line 33g to output the bit-line signals on consecutive bit-lines 33f to an output line 33h connected to the logic and control circuit 34. Also shown is a voltage amplifier 33d used to amplify the resulting analog photosensor element signals. The analog photosensor element signals are then output on line 33h to the analog-to-digital converter 44 and converted to digital photosensor element signals.

III. The Logic and Control Circuit

FIG. 6 shows the light sensing and logic circuit 26 comprising the photosensor array 32 and the logic and control circuit 34. The logic and control circuit 34 comprises a logic circuit 46, a clock 47, a random-access-memory (RAM) 50, or other appropriate memory, and a digital-to-analog converter 52. The logic circuit 46 is preferably a dedicated configuration of digital logic elements constructed on the same semiconductor substrate as the photosensor array 32. Alternatively, the logic circuit 46 may also be a microprocessor comprising a central processing unit (CPU) and a read-only-memory (ROM). The logic circuit 46 may also be implemented using gate array technology or any other appropriate hardwired logic circuit technology.

The logic circuit 46 interfaces with the clock 47, provides array control signals to the photosensor array 32, manages data flow to and from the RAM 50 and converters 44 and 52, and performs all computations for determining a digital mirror control signal $V_{DAC}(Z)$ for causing the variable reflectance mirror element 1a to assume a desired reflectance level. As discussed, the analog-to-digital converter 44 converts the analog photosensor element signals to the digital photosensor element signals processed by the logic circuit 46. It has been found that an eight-bit analog-to-digital converter 44 provides adequate data resolution for controlling the mirrors 1, 4 and 5. Preferably, the analog-to-digital converter 44 is constructed on the same semiconductor substrate as the photosensor array 2 as shown in FIG. 5.

The digital photosensor element signals output to the logic and control circuit 34 are generally stored in the RAM 50 for processing. The values of the digital photosensor element signals for the photosensor array PA(N,M) are correspondingly stored in an array in the RAM 50 designated RA(N,M). The logic circuit 46 processes the values of each of the digital photosensor element signals, which are designated Val RA(n,m), to determine an instantaneous or substantially real-time background light signal $B_t$ for a time period t and at least one peak light signal P(z). The logic circuit 46 uses these signals, which may also be temporarily stored in the RAM 50, to determine a digital control signal $V_{DAC}(Z)$ to cause at least one mirror or mirror segment to assume a desired reflectance level. The digital mirror control signal $V_{DAC}(Z)$ is then output to the digital-to-analog converter 52, which outputs a corresponding analog mirror control signal Vc(z) to a mirror drive circuit 24. Alternatively, the digital-to-analog converter 52 need not be used if the logic circuit 46 generates a pulse-width-modulated (PWM) mirror control signal to control the mirror drive circuit 24.

The mirror drive circuit 24 comprises mirror drive circuits 24a, 24b and 24c. The drive circuit 24 drives mirrors 28, which comprises a rearview mirror 28a (mirror A), a left side view mirror 28b (mirror B) and a right side view mirror 28c (mirror C). Mirrors A, B and C correspond, respectively, to the rearview mirror 1, the left side view mirror 4 and the right side view mirror 5 shown in FIG. 2. It is, of course, within the scope of the present invention for the mirror A to be a mirror other than the rearview mirror 1. It is similarly within the scope of the present invention for the mirror B to be a mirror other than the left side view mirror 4, and for the mirror C to be a mirror other than the right side view mirror 5. It is also within the scope of the invention for the mirrors A, B and C to be mirror segments or zones of the variable reflectance mirror element 1a where the peak sub-array S(X) for each zone corresponds to a segment of the variable reflectance mirror element 1a. Thus, for example, S(1) may correspond to a center mirror segment, S(2) may correspond to a left mirror segment and S(3) may correspond to a right mirror segment. Any other appropriate mirror segmentation scheme may also be used.

A sensitivity control circuit 42 is used to input a sensitivity signal S to the logic and control circuit 34. In addition, signals from a force-to-day (maximum reflectance) switch 36, a reverse-inhibit (maximum reflectance) switch 38 and a force-to-night (minimum reflectance) switch 40 may also be input to the logic and control circuit 34. The switch 3 of FIGS. 1A and 1B may include the sensitivity control circuit 42, as well as the force-to-day switch 36 and the force-to-night switch 40.

The switches 36, 38 and 40 each generate a signal causing the logic circuit 46 to override its normal operation, as will be described with respect to FIGS. 7, 8A and 8B, and to output mirror control signals $V_c(z)$ to the mirror drive circuit 24 causing the variable reflectance mirror 28 to assume a maximum or minimum reflectance level in accordance with the appropriate signals from the switches 36, 38 or 40. Finally, the logic and control circuit 34 may also be used to control a vehicle lighting switch 45 to automatically turn on and off a vehicle's headlights and sidelights. This feature will be further described later.

IV. Operation of the Invention

Figure 7:
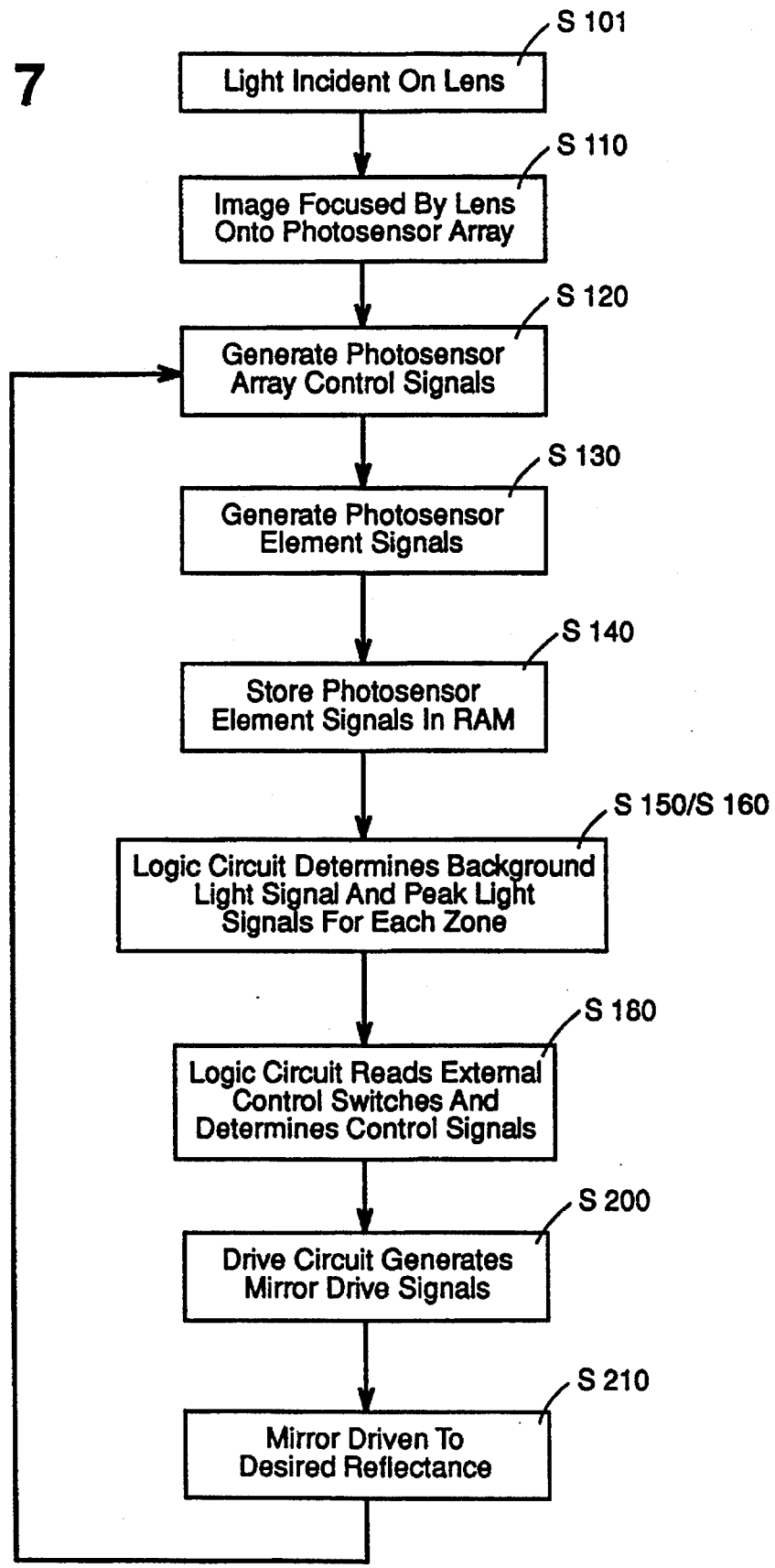
FIG. 7 is a flow chart illustrating the method of the present invention for controlling the reflectance of a rearview mirror or mirrors.

FIG. 7 shows an overview of the logic flow chart and method for controlling the reflectance levels of any one or all of the mirrors or mirror segments 28a, 28b or 28c. It should be understood that the reflectance level of each of the mirrors 28a, 28b and 28c in the automatic rearview mirror system of the present invention may be commonly or independently controlled. FIGS. 8A, 8B and 9 provide more detail on the logic and method of FIG. 7.

In step S101 of FIG. 7, light information seen rearwardly of the rearview mirror 1 is incident on the lens 30. In step Si10, light passing through the lens 30 is refracted such that the light information is imaged or focused onto the photosensitive surface of the photosensor array 32. In step S120, the logic circuit 46 generates and outputs the array control signals to the photosensor array 32. In step S130, photosensor element signals indicative of the light levels incident on each of the photosensor elements 32a are generated. In step S140, these photosensor element signals are temporarily stored in RAM or any other appropriate memory. In steps S150 and S160, the logic circuit 46 determines values for the background light signal and the peak light signal for each zone corresponding to each of the mirrors 28. In step S180, the logic circuit 46 uses the background and peak light signals of step S150 to determine the control signals required to cause each of the mirrors 28 to achieve a desired reflectance level. Also, the logic and control circuit 34 in step S180 reads and processes the states of the optional sensitivity control circuit 42, force-to-day switch 36, force-to-night switch 40 and reverse-inhibit switch 38. In step $200, the mirror drive circuits 24 use the control signals determined in step S180 to generate drive signals to cause the mirrors 28 to assume the desired reflectance levels in step S210.

In one embodiment of the invention, the logic circuit 46 determines the background light signal $B_t$ in steps S150 and S160 by calculating the average value of the photosensor element signals, previously stored in RAM in step S140, for the photosensor elements 32a in a lowest row or rows of the photosensor array 32 corresponding to an area below the rear window. With respect to FIGS. 3A and 3B, this means that the background light signal $B_t$ is determined from photosensor element signals generated by the photosensor elements 32a located in row D of the photosensor matrix array 32. The logic circuit 46 may then output $B_t$ to the RAM 50 for later processing. The logic circuit 46 may also determine $B_t$ by calculating an average value of all of the photosensor element signals in the entire photosensor array 32. More generally, the background light signal $B_t$ for the rearward scene may be determined by calculating the average value of the lowest X percent of the photosensor element signal values in the RAM array RA(N,M), where X is preferably 75, but typically may be in the range of 5 to 100.

Additionally, the background light signal $B_t$ is preferably change-limited to determine a limited background light signal $B_{Lt}$. The signal $B_t$ may be change-limited, for example, by limiting changes in the background light signal $B_t$ to 2% per time frame. A time frame may be, for example, 250 milliseconds or any other time relating to the rate at which the logic circuit 46 samples the photosensor element signals from the photosensor array 32. The logic circuit 46 determines the change-limited value $B_{Lt}$ used to determine the digital mirror control signal $V_{DAC}(z)$ as follows: $B_{Lt} = B_{L(t-1)} + C_L \times (B_t - B_{L(t-1)})$, where $B_{Lt}$=the change-limited background light signal for a current time frame t, $B_t$=the actual or substantially real-time background light signal for the current time frame t, $B_{L(t-1)}$=the change-limited background light signal for a previous time frame (t-1) and $C_L$=the change-limit value. Additionally, the background light signal $B_t$ from step S150 may be processed by the logic circuit 46 to determine whether the change limited background light signal $B_{Lt}$ is less than or greater than $B_{L(t-1)}$. If $B_{Lt}$ is greater than $B_{L(t-1)}$, then the logic circuit 46 may use a higher change-limit value $C_{LH}$ to determine $B_{Lt}$. If the background light signal $B_{Lt}$ is less than or equal to $B_{L(t-1)}$, then the logic circuit 46 may use a lower change-limit value $C_{LL}$ to determine $B_{Lt}$. The values $C_{LH}$ and $C_{LL}$ are in the range of 0.01 to 2, but are preferably on the order of about 0.02 or 2%.

The logic circuit 46 in step S150 also determines the peak light signal P(z) for each zone or sub-array S(X) of the photosensor matrix array 32. The peak light signal P(z) used to determine the appropriate mirror control signal $V_C(z)$ for the mirror 28 may be determined by counting or summing the number of occurrences where the digital value for a photosensor element signal is greater than a peak threshold value F for each zone or sub-array S(X). For the preferred analog-to-digital converter having eight-bit data resolution, the logic circuit 46 generates digital values indicative of light levels of light incident on each photosensor element 32a in the range of 0 to 255 ($2^8-1=255$), with headlights resulting in values in the range of about 200 to 255, so that the peak threshold value F is selected to be in the range of about 200 to 255 but is preferably 245. The resulting count or sum P(z) provides a measure of the peak light level for the following reasons.

One design objective of the lens 30 and the photosensor array 32 combination is to be able to measure background light levels in the approximate range of 0.01 to 0.1 lux when driving on sufficiently dark roads. This is achieved by ensuring that the lens 30, photosensor elements 32a and charge-to-voltage amplifiers 33c are able to measure such light levels and by providing a maximum exposure time. The maximum exposure time determines the operating frequency or sampling rate of the system 20. In the case of the described system, 1.5 MHz has been found to be appropriate.

By varying the exposure time relative to a general background light level B and using a substantially constant sampling rate, a wide range of background light levels in the range of 0.01 to 1000 lux can be measured. Thus, when the background light level is low, the exposure time is relatively long such that headlights within the rearward area cause the affected photosensor elements 32a to saturate. Correspondingly, for higher background light levels, the exposure time is reduced. Saturation occurs when the incident light charges the photosensor element 32a to capacity so that any excess charge will leak or transfer to adjacent photosensor elements 32a. This charge leakage effect is commonly referred to as "blooming." It has been found that a count of the number of photosensor elements 32a at or near saturation, i.e., those having digital values greater than the peak threshold value F, provides an excellent approximation of the peak light levels and is further described in FIG. 8A. The above described method effectively extends the range of measurable light levels for the photosensor array 32.

Alternatively, if an anti-blooming device is incorporated in the photosensor array 32, such as is well known to those skilled in the art, then the peak light signal P(z) may be determined by calculating an average value of Y percent of the highest photosensor element signal values for each zone, where Y is preferably 10, but may be in the range of 1 to 25. When using this approach for determining P(z), it is also preferable to include logic to adjust the sampling rate or operating frequency of the logic circuit 46 to an appropriate value depending on $B_{Lt}$.

The general background light signal B, whether $B_t$ or $B_{Lt}$, and the peak light signal P(z) for each zone of the photosensor array 32, as determined in steps S150 and S160, are then used by the logic circuit 46 to determine a mirror control signal $V_C(z)$ as a function of the ratio of $B^n$ (n preferably has a value of one but may typically range from 0.8 to 1.3) to P(z), i.e., $V_C(z)=f(B^n/P(z))$. The control signal $V_C(z)$ is then output to the mirror drive circuits 24 in step S180 to drive the mirrors 28 or segments thereof to their desired reflectance level in the steps S200 and S210.

V. The Preferred Embodiment

The general lighting conditions of the rearward scene can be defined as follows: the background light level of the viewed rearward scene is B and the peak light level for each zone or sub-array S(X) is P(z). A contrast ratio C(z) may be defined as the ratio of the peak light level P(z) for each zone to the general background light level B; thus, C(z)=P(z)/B. Given the background light level B, the human eye can tolerate varying peak light levels in the viewed rearward scene up to a particular contrast ratio tolerance $C_T$. Contrast ratios greater than $C_T$ initially cause discomfort and are generally known as glare. As the eye adjusts its light sensitivity to protect itself from the discomforting peak or glare light levels, vision is reduced and the glare may become disabling. Thus, the maximum tolerable peak light level $P_T$ of the viewed rearward scene is equal to the product of the contrast ratio tolerance $C_T$ and the background light level B, i.e., $P_T = C_T \times B$.

The desired reflectance $R_d(z)$ of a variable reflectance mirror for each zone is that reflectance level which reduces a peak light level P(z) to a value equal to the maximum tolerable peak light level $P_T$, i.e., $P_T = R_d(z) \times P(z)$ or $R_d(z) = P_T/P(z)$, and substituting the expression for $P_T$, $R_d(z) = (C_T \times B)/P(Z)$. However, the maximum tolerable contrast ratio $C_T$ varies across the population due to aging and other factors; accordingly, a sensitivity factor S may be used to account for this variation in contrast tolerance sensitivity so that $R_d(z) = (S \times C_T \times B)/P(z)$. Selecting the desired reflectance $R_d(z)$ for each zone provides maximum information from the rearward scene viewed in each mirror or mirror segment while reducing discomforting or disabling peak light levels to tolerable levels.

The mirror control signal $V_C(Z)$ required to obtain the desired reflectance $R_d(z)$ depends on the particular variable reflectance mirror element that is used. For electrochromic mirrors, a voltage-reflectance relationship can be approximated and generally defined. In general, an electrochromic mirror has a reflectance level R having a maximum value of $R_1$ with an applied voltage $V_{app}$ of 0 volts. As the applied voltage $V_{app}$ is increased, the reflectance level R perceptually remains on the order of $R_1$ until $V_{app}$ reaches a value of approximately $V_1$. As $V_{app}$ is further increased, the reflectance level R decreases approximately linearly until a minimum reflectance of approximately $R_2$ is reached at a voltage $V_2$. Thus, the applied voltage $V_{app}$ can be approximately defined as:

$$V_{app} = V_1 + (R_1 - R) \times (V_2 - V_1)/(R_1 - R_2)$$

Substituting desired reflectance $R_d(z)$ for the reflectance R results in the mirror control signal, the voltage of which is determined as follows:

$$V_C(z) = V_1 + (R_1 - S \times C_T \times B/P(z)) \times (V_2 - V_1)/(R_1 - R_2).$$

To obtain a digital value $V_{DAC}(z)$, $V_C(z)$ is scaled by a factor that is the ratio of the maximum digital value to the value $V_2$; thus, for eight-bit data resolution $V_{DAC}(z) = 255\, V_C(z)/V_2$, and substituting for $V_C(Z)$:

$$V_{DAC}(z) = 255(V_1 + (R_1 - S \times C_1 \times B/P(z)) \times (V_2 - V_1)/(R_1 - R_2))/V_2.$$

Figure 8A:
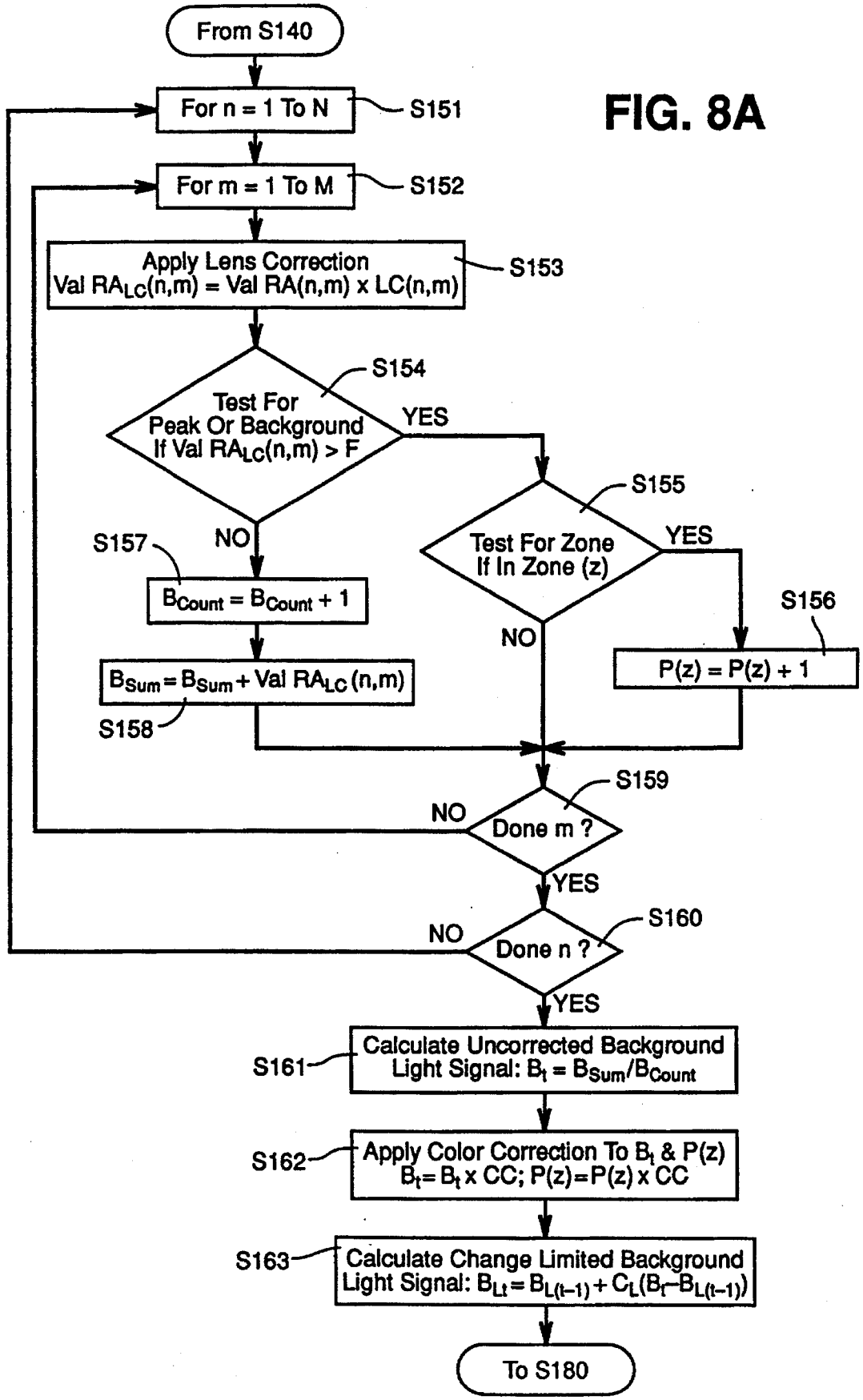
FIGS. 8A and 8B are detailed flow charts for steps S150, S160 and S180 of FIG. 7.
Figure 9:
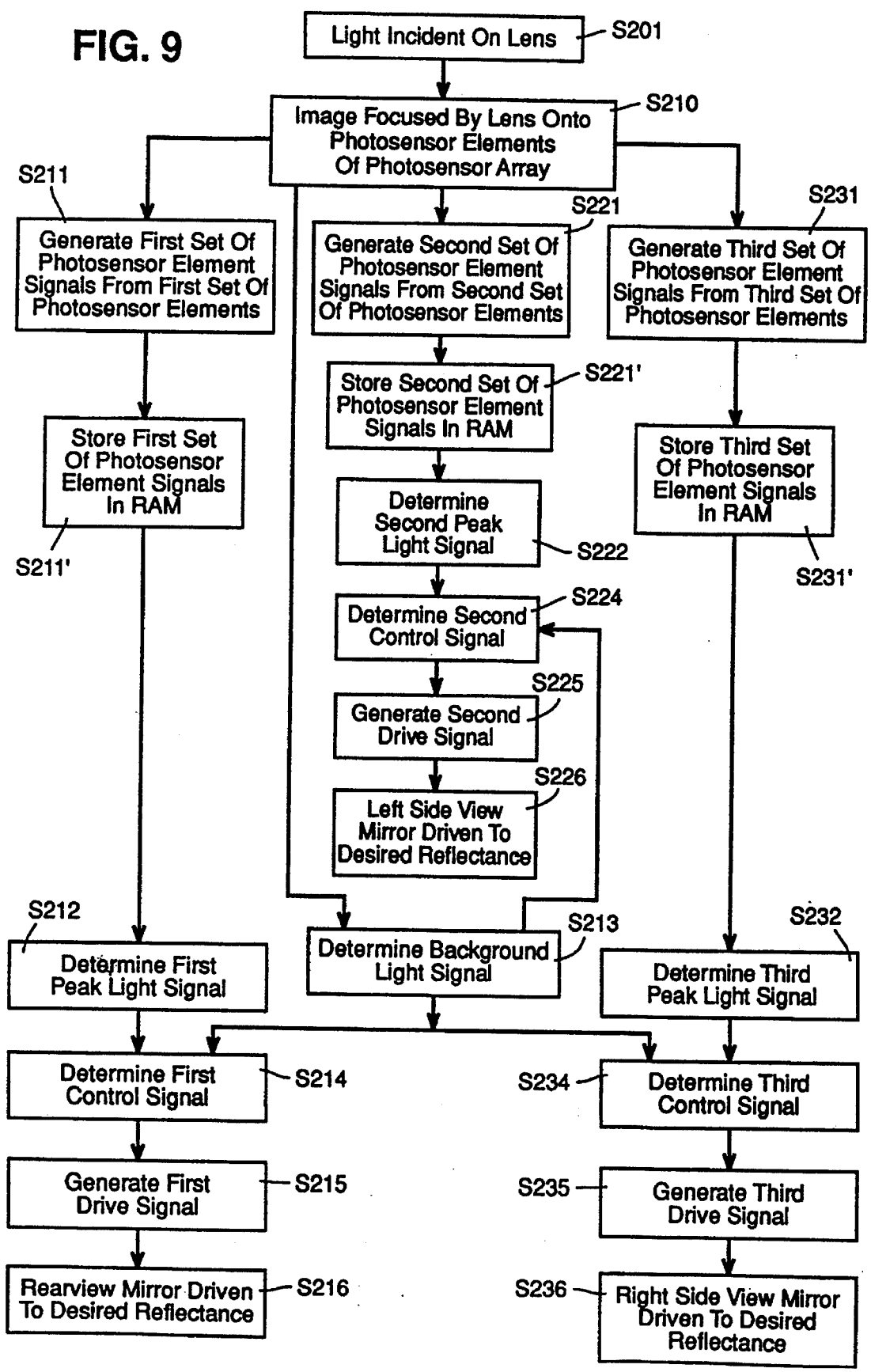
FIG. 9 is a flow chart of the general logic flow of FIGS. 7, 8A and 8B for controlling the reflectance of three mirrors.

FIG. 8A provides further detail on the steps S150 and S160 where the logic circuit 46 determines the background and peak light signals. More particularly, steps S151, S152, S159 and S160 provide two processing loops for sequentially determining the digital values indicative of the photosensor element signals, Val RA(n,m), in the RAM array RA(N,M) for each of the photosensor elements 32a of the photosensor array PA(N,M).

In step S153, a lens correction factor LC(n,m) is applied to each digital value indicative of the photosensor element signal, Val RA(n,m), to correct for the effects of lens 30, which results in a lens corrected digital value of the photosensor element signal Val $RA_{LC}(n,m)$. These effects are typically referred to as cosine effects or Lambert's Law effects. The lens correction factor LC(n,m) depends on the radial distance of the photosensor element 32a from a central axis of the lens 30, and is typically in the range of 1 to 15 but will depend on the geometry of the lens and the selected photosensor array. The lens correction factor LC(n, m) applied to each Val RA(n,m) may be calculated according to Lambert's Law each time Val RA(n,m) is processed. More preferably, the logic circuit 46 initially stores an array of values LC(n,m) in the RAM 50 for each photosensor element 32a of the photosensor array PA(n,m) during an initialization routine. Alternatively, the size of the photosensor elements 32a of the photosensor array 32 may be adjusted to correct for the lens effects at each photosensor element 32a.

As discussed, it has been found that light levels for headlights generally result in an eight-bit digital value greater than a peak threshold value F having a value of about 245. Correspondingly, during non-daylight operation of the automatic rearview mirror system 20, background light levels generally result in eight-bit digital values indicative of the light levels incident on the photosensor elements 32a that are less than or equal to the peak threshold value F.

Accordingly, the lens corrected value Val $RA_{LC}(n,m)$ is compared in step S154 to the peak threshold value F. If Val $RA_{LC}(n,m)$ is less than or equal to F it is used to increment a counter $B_{Count}$, in the logic circuit 46, by 1 in step S157 (thereby indicating that a value less than or equal to F has been identified) and by increasing a value $B_{Sum}$ by the value of Val $RA_{LC}(n,m)$ in step S158, where $B_{Sum}$ is the sum of all the values of Val $RA_{LC}(n,m)$ which are less than or equal to F. The background light signal $B_i$ is then determined in step S161 as follows: $B_i = B_{Sum}/B_{Count}$. If Val $RA_{LC}(n,m)$ is greater than F in step S154, then the logic circuit 46 uses a counter P(z) indicative of the peak light levels for each of the zones or sub-arrays S(X) of the photosensor array PA(N,M) which is incremented by 1 as previously described. More particularly, Val $RA_{LC}(n,m)$ is tested in step S155 to determine whether it originates from a particular zone or sub-array S(X), where X=1 to Z. If Val $RA_{LC}(n,m)$ does not fall within a defined zone or sub-array S(X), then P(z) is not incremented; otherwise, P(z) is incremented in step S156 for the appropriate zone.

If the photosensor array 32 is arranged to view the rearward area through the active layer of the variable reflectance element 1a, then a color correction factor CC is applied in step S162 to $B_t$ and P(z) to compensate for any reduction in transmittance when the reflectance level (and transmittance) of the rearview mirror 1 is reduced. The value of CC is determined from the last calculated value indicative of the digital mirror control signal $V_{DAC}(z)$ applied to the rearview mirror 1. In step S163, a change-limited background light signal $B_{Li}$ is determined as has been described previously.

Figure 8B:
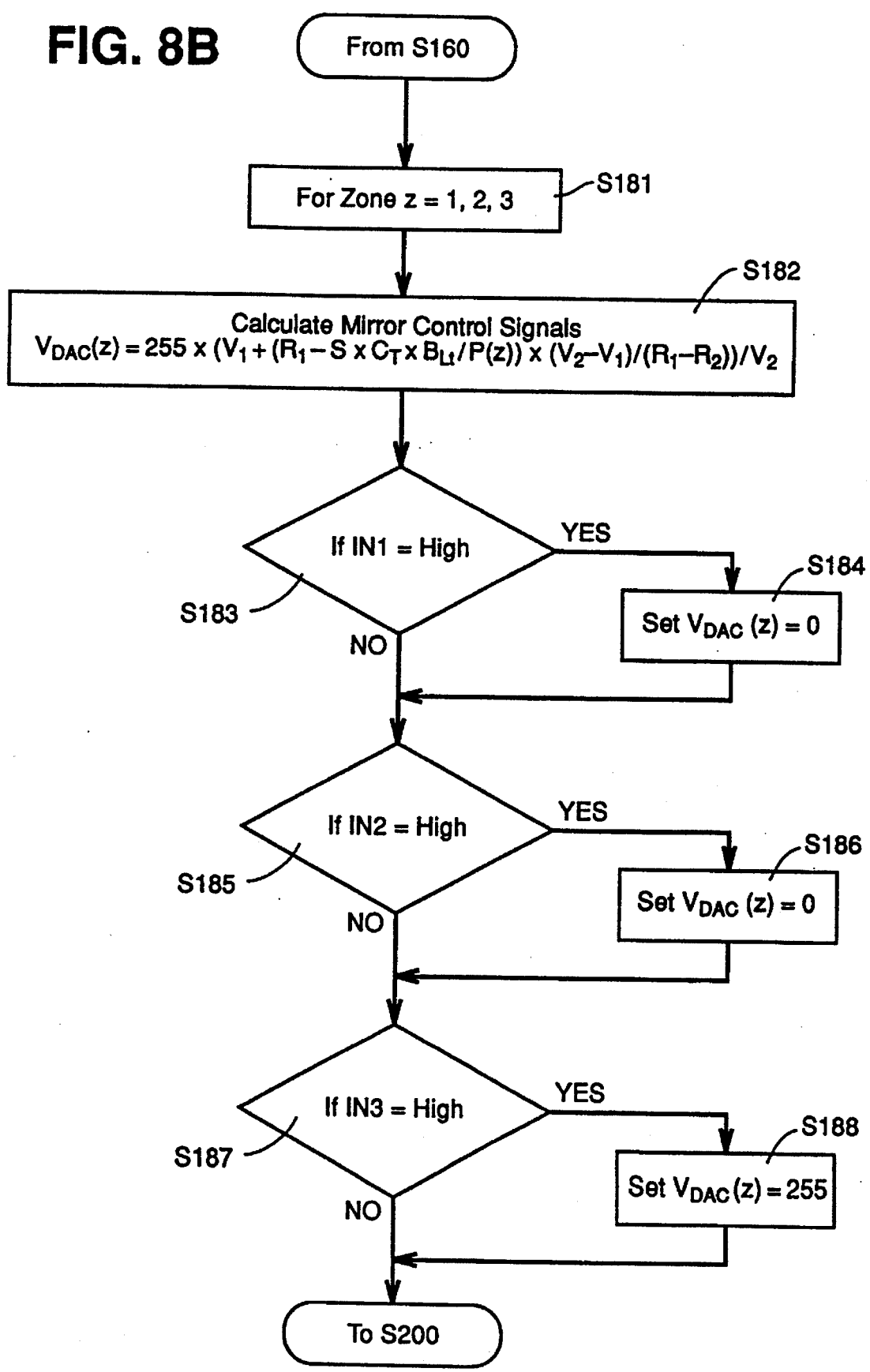

FIG. 8B provides further detail on step S180 where the logic circuit 46 determines the appropriate digital mirror control signal $V_{DAC}(z)$ for each zone or sub-array $S(X)$ and corresponding mirror 28. In steps S181 and S182, $V_{DAC}(z)$ is calculated for each mirror 28. In step S183, the logic circuit 46 reads a state IN1 of the reverse-inhibit switch 38 and if the vehicle is in reverse gear so that IN1 is high, then all digital mirror control signals $V_{DAC}(z)$ are set to 0 in step S184 forcing the mirror 28 to its maximum reflectance level. In step S185, a state IN2 of the force-to-day switch 36 is read and if IN2 is high, then all digital mirror control signals $V_{DAC}(z)$ are set to 0 in step 186 forcing the mirror 28 to its maximum reflectance level.

Finally, in step S187, a state IN3 of the force-to-night switch 40 is read and if IN3 is high, then all digital mirror control signals $V_{DAC}(z)$ are set to 255 (the maximum digital value for eight-bit data resolution) in step S188 forcing the mirror 28 to its minimum reflectance level.

FIG. 9 shows another view of the logic flow whereby the rearview mirror, the left side view mirror and the right side view mirror (or alternatively three mirror segments) are independently driven to their desired reflectance levels by the independent and separate control and drive signals using photosensor element signals from three photosensor element sets (i.e., the sub-arrays S(1), S(2) and S(3) of photosensor elements 32a in the photosensor array PA(n,m)). The specific subroutines shown in FIGS. 8A and 8B corresponding to the general steps shown in FIG. 7 are also used with the general steps shown in FIG. 9.

In step S201, light incident on the lens 30 is focused in step S210 onto the photosensor array 32 comprising the first, second and third sets of photosensor elements 32a in zones a, b and c, respectively. Next, in step S211, the light incident on the first photosensor element set in zone a generates a first set of photosensor element signals, which, in step S211', are then stored in RAM and later used by the logic circuit 46 to determine a first peak light signal in step S212.

In step S221, the light incident on the second photosensor element set in zone b generates a second set of photosensor element signals, while in step S231, the light incident on the third photosensor element set in zone c generates a third set of photosensor element signals. The second set of photosensor element signals, generated in step S221 are also stored in step 221' in RAM and then used by the logic circuit 46 to determine a second peak light signal in step S222. Similarly, the third set of photosensor element signals, generated in step S231, is next stored in step S231' in RAM and then used by the logic circuit 46 to determine a third peak light signal in step S232.

In step S213, photosensor element signals generated from selected photosensor elements on which light is incident in step S210 are used to determine the background light signal.

In step S214, the logic circuit 46 uses the background light signal determined in step S213 and the first peak light signal determined in step S212 to determine a first control signal. Similarly, the logic circuit 46 uses the background light signal of step S213 and the second peak light signal determined in step S222 to determine a second control signal in step S224. In the same manner, the background light signal of step S213 and the third peak light signal of step S232 are used by the logic circuit 46 to determine a third control signal in step S234.

The first control signal determined in step S214 is used by the drive circuit 24a to generate a first drive signal in step S215. This first drive signal drives the rearview mirror 28a to a desired reflectance level in step S216. Likewise, the second control signal determined by the logic circuit 46 in step S224 is used by the drive circuit 24b to generate a second drive signal in step S225, which is then used to drive the left side view mirror 28b to a desired reflectance level in step S226. Finally, the third control signal determined by the logic circuit 46 in step S234 is used by the drive circuit 24c to generate a third drive signal to drive the right side view mirror 28c to a desired reflectance level in step S236. Of course, the first, second and third control signals may also be used to control the segments of a mirror 28.

Finally, as previously discussed, one advantage of the present invention is that it is able to use a single photosensor array 32 to determine both a background light level and a peak light level for controlling the reflectance level of a mirror. This is especially advantageous where the sensor must be placed outside the interior of the vehicle to view the rearward scene. This may be required, for example, in certain truck type vehicles where only exterior side view mirrors may be used and automatic operation is desired. Accordingly, the photosensor array 32 may be located with each side view mirror. The other electronics for the automatic rearview mirror system 20, described previously, may be located either with the photosensor array 32 in each side view mirror, inside the vehicle cab or elsewhere in or on the vehicle. A desired reflectance level for each exterior side view mirror may then be accurately determined using both the determined background light level and peak light level using only a single photosensor array 32 for each mirror.

VI. Integrated Headlight Control System

It is generally important for driver safety reasons that the headlights and sidelights of operating vehicles are turned on as night approaches or when background lighting levels fall below approximately 500 lux. More particularly, it is desirable to have the vehicle's headlights and sidelights automatically turn on when background lighting levels fall to a sufficiently low level and automatically turn off when background lighting levels rise sufficiently.

While there are other automatic headlight control systems, such systems require that the photocells, which are used to control the headlights, be located and positioned so that they generally face upward either to avoid the effects of oncoming headlights for generally forward facing photocells or to avoid the effects of following headlights for generally rearward facing photocells.

An advantage of the automatic rearview mirror system 20 is that the background light signal $B_{Lt}$ may be used to automatically turn on and off a vehicle's headlights and sidelights by controlling the vehicle lighting switch 45. Importantly, since $B_{Lt}$ is determined regardless of the presence of peak light sources, such as oncoming or following headlights, the directional constraints on how and where the sensor is located or positioned are avoided. Accordingly, using the photosensor array 32 of the present invention to provide additional vehicle lighting control functions results in lower costs and improved reliability over other headlight control systems.

The limited background light signal $B_{Lt}$ has been described for the purpose of controlling the reflectance levels of an automatic rearview mirror system 20. Additionally, the logic circuit 46 may use $B_{Lt}$ to generate a vehicle lighting control signal to control the vehicle lighting switch 45 to turn on and off automatically the vehicle's headlights and sidelights. The ability to use $B_{Lt}$ is important because the vehicle lighting switch 45 should not be responsive to rapid or small fluctuations in background light levels in the region of the desired point at which the vehicle lighting switch is turned on or off, i.e., the switch point. Such fluctuations can be caused by the shadowing effect of overhanging trees or structures or the lighting differences between the eastern and western skylines at dawn and dusk which may be encountered when turning the vehicle.

Additionally, hysteresis is also provided between the switch-on and switch-off conditions of the vehicle lighting switch 45 to further stabilize operation of the switch 45 in such fluctuating light conditions. More specifically, if the required switch point for falling light levels is SP, then the switch point for rising light levels is SP×(1+H), where H is a hysteresis factor typically in the range of about 0.005 to 0.5, but is preferably 0.2. Thus, if $B_{Lt}$ is less than SP, then the vehicle lighting control signal to the vehicle lighting switch 45 is set high to turn on the vehicle's headlights and sidelights. If $B_{Lt}$ is greater than SP×(1+H), then the vehicle lighting control signal to the vehicle lighting switch 45 is set low to turn off the vehicle's headlights and sidelights.

Additionally, if the photosensor array 32 and logic circuit 46 are both powered directly by the vehicle's electrical system through the ignition switch, then a time delay $t_d$ may be provided such that if the ignition switch is turned off when the headlight control signal is set high, the vehicle lighting control signal will remain high for a time $t_d$ and thereafter fall to a low value to turn off the vehicle's headlights and sidelights. A manual control may also be provided to allow the driver to adjust the time delay $t_d$.

Finally, the vehicle lighting control signal and, more specifically, the lighting control switch 45 may also be used to inhibit automatic control of the automatic rearview mirror system 20. For example, if the vehicle lighting control signal indicates that the vehicle lighting should be turned off, then the logic and control circuit 34 may be used to enable sensitivity switch 42 or some other switch allowing the driver to manually adjust the reflectance level of the mirrors 28. Thus, the driver may manually select a lower reflectance level during daylight conditions to provide protection against peak light sources, such as a bright setting sun. As background light levels fall or during non-daylight conditions, the vehicle lighting control signal would indicate non-daylight conditions and the logic and control circuit 34 may then be used to disable manual control and return the automatic rearview mirror system 20 to full automatic control.

VII. The Automatic Rearview Mirror System

Figure 10:
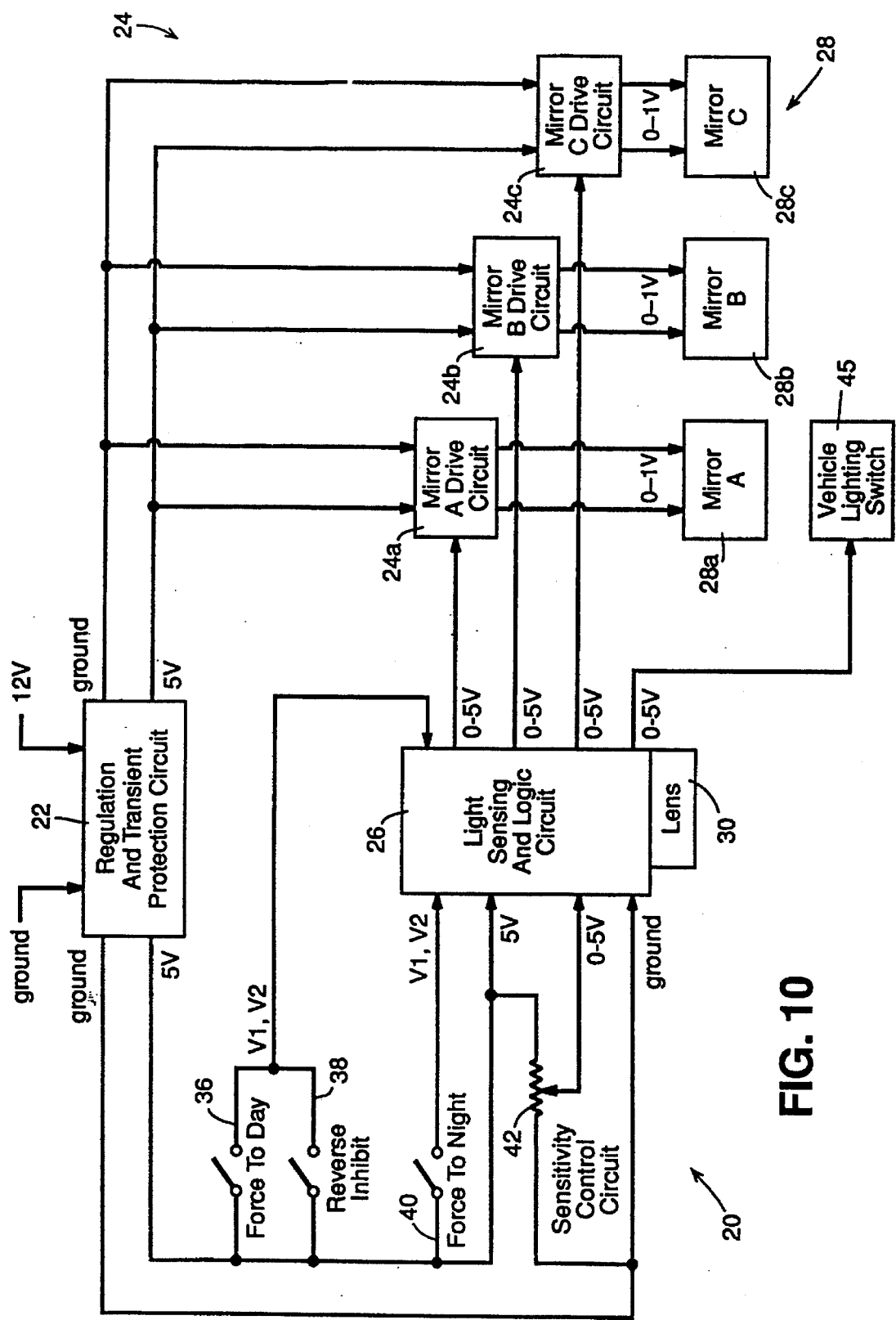
FIG. 10 is another schematic block diagram of the automatic rearview mirror system of the present invention.

FIG. 10 also shows the automatic rearview mirror system 20 of the present invention. The system 20 is powered by the vehicle's electrical system (not shown) to which the system 20 is connected. A voltage regulation and transient protection circuit 22 regulates power and protects the system 20 from voltage transients as is well known in the art. The circuit 22 is connected to the vehicle's electrical system and to ground, and outputs a voltage of up to about 5 volts to power the mirror drive circuits 24 and the light sensing and logic circuit 26. The circuit 22 also has a ground line connected to the light sensing and logic circuit 26.

The 5 volt line is also connected to the force-to-day switch 36 and the reverse-inhibit switch 38 (connected in parallel to the light sensing and logic circuit 26) which are used to force the mirrors 28 to their maximum reflectance level. More particularly, when either of these switches is closed, they generate a high level signal $V_H$ such as a 3 volt signal, which is input to the light sensing and logic circuit 26. This high level signal overrides the normal operation of the light sensing and logic circuit 26 causing it to output a control signal to the drive circuits 24 to drive the mirrors 28 to their maximum reflectance level. Conversely, when these switches are open, they each generate a low level signal $V_L$ such as a signal of less than 3 volts, thereby permitting normal operation of the light sensing and logic circuit 26, as has been discussed with respect to FIGS. 7, 8A and 8B. The force-to-day switch 36 and the reverse-inhibit switch 38 may be alternatively configured to generate a low level signal when closed and a high level signal when open. The force-to-day switch 36 is a manually operated switch and is preferably placed on the rearview mirror 28a and may be switch 3. The reverse-inhibit switch 38 is connected to a reverse inhibit line in the vehicle's electrical system (not shown) so that the reverse-inhibit switch 38 is actuated automatically whenever the vehicle is in reverse gear.

The force-to-night switch 40, used to force the mirrors 28 to their minimum reflectance level, generates a high level signal $V_H$ when closed and a low level signal $V_L$ when opened. The signal $V_H$ or $V_L$ is then input to the light sensing and logic circuit 26. The high level signal may, for example, be between 3 to 5 volts and the low level signal may be below 3 volts. The high level signal overrides the normal operation of the light sensing and logic circuit 26, as discussed with respect to FIGS. 7, 8A and 8B, causing the circuit 26 to output a control signal to the drive circuits 24 to drive the mirrors 28 to their minimum reflectance level. The low level signal, on the other hand, permits normal operation of the light sensing and logic circuit 26. Alternatively, the force-to-night switch 40 may be configured to generate a low level signal when closed and a high level signal when open. The force-to-night switch 40 is also a manually operable switch, preferably located on the rearview mirror 28a, and may also be switch 3.

The light sensing and logic circuit 26 is also connected to the sensitivity control circuit 42. The circuit 42 enables the operator to manually adjust the sensitivity of the mirrors 28 using the switch 3 (shown in FIGS. 1A and 1B). The sensitivity control circuit 42 (switch 3) may comprise a potentiometer whose voltage may be varied from zero to five volts. Alternatively, a single resistor may be used to provide a single preset sensitivity setting that cannot be changed by the driver.

As previously discussed with respect to FIGS. 5 and 6, the light sensing and logic circuit 26 comprises the photosensor array 32 (or other light sensing device) and the logic and control circuit 34. These two devices may be either separate or commonly located on a single semiconductor substrate. The light sensing and logic circuit 26 is preferably a single VLSI CMOS circuit.

Also shown in FIG. 10, the light sensing and logic circuit 26 outputs analog mirror control signals having voltages varying from zero to approximately 5 volts to the mirror drive circuits 24 and a vehicle lighting control signal of 0 to 5 volts to the vehicle lighting switch 45. Alternatively, as previously discussed the light sensing and logic circuit 26 may output a 5 volt pulse-width-modulated (PWM) signal to the mirror drive circuits 24. The mirror drive circuits 24 then generate and apply drive voltages varying from a low voltage on the order of 0 volts to a high voltage on the order of 1 volt to drive the mirrors 28. The actual driving voltage (or current) may, of course, be significantly lower or higher depending on the variable reflectance mirror element 1a used.

Each of the mirrors 28 preferably comprises a reflective electrochromic (EC) cell whose reflectance level may be varied from a maximum of anywhere from approximately 50 to 90 percent to a minimum of approximately 4 to 15 percent, and having a maximum driving voltage on the order of about 1 to 2 volts. As is well known in the art, electrochromic devices change their reflectance level when a voltage or other appropriate drive signal is applied to the electrochromic device. The mirrors 28 alternatively may comprise any other suitable variable reflectance mirror.

As previously discussed, it is also within the scope of the present invention for the light sensing and logic circuit 26 to be located remotely from the mirrors 28 of the system 20. However, it is preferred that the light sensing and logic circuit 26 be integral with the rearview mirror 28a such that: (1) the center line of the field of view of the photosensor array 32 is substantially perpendicular to the reflective surface of the rearview mirror 28a; and (2) the horizontal field of view of the photosensor array 32 is aligned with the horizontal axis of the rearview mirror 28a. As a result, the photosensor array 32 receives the light that will be incident on the rearview mirror 28a as shown in FIG. 6.

The individual components represented by the blocks shown in the schematic block diagrams of FIGS. 6 and 10 are well known in the art relating to automatic rearview mirrors, and their specific construction and operation is not critical to the invention or the best mode for carrying out the present invention. Moreover, the logic flow charts discussed in the specification and shown in FIGS. 7, 8A and 8B may be implemented in digital hardwired logic or programmed into well-known signal processors, such as microprocessors, by persons having ordinary skill in the art. Since such digital circuit construction or programming per se is not part of the invention, no further description thereof is deemed necessary.

While the present invention has been described in connection with what are the most practical and preferred embodiments as currently contemplated, it should be understood that the present invention is not limited to the disclosed embodiments. Accordingly, the present invention is intended to cover various modifications and equivalent arrangements, methods and structures that are within the spirit and scope of the claims.

What is claimed is:

1. An automatic rearview mirror system for an automotive vehicle comprising:

at least one variable reflectance rearview mirror;

an array of sensing elements to sense light levels in an area rearward of said at least one variable reflectance rearview mirror, each of said sensing elements adapted to sense light levels of light incident thereon and to output an electrical signal indicative of said sensed light levels;

a signal processor, connected to said array of sensing elements, receiving and using the electrical signals indicative of the sensed light levels from said sensing elements to determine a first electrical signal indicative of a background light level in the area rearward of said at least one variable reflectance rearview mirror and to determine a second electrical signal indicative of at least one peak light level in the area rearward of said at least one variable reflectance rearview mirror, wherein said signal processor determines at least one control signal indicative of a desired reflectance level of the at least one variable reflectance rearview mirror from the first electrical signal indicative of the background light level and the second electrical signal indicative of the at least one peak light level; and at least one drive circuit connected to said signal processor and to said at least one variable reflectance rearview mirror for receiving said at least one control signal and generating and applying at least one drive signal to said at least one variable reflectance rearview mirror to drive said at least one variable reflectance mirror to the desired reflectance level.

2. The automatic rearview mirror system defined by claim 1, further comprising an imaging system to focus an image of the area rearward of said at least one variable reflectance rearview mirror onto said array.

3. The automatic rearview mirror system defined by claim 2, wherein said imaging system comprises a lens.

4. The automatic rearview mirror system defined by claim 3, further comprising a semiconductor substrate on which said array of sensing elements is formed.

5. The automatic rearview mirror system defined by claim 4, wherein said imaging system is constructed integrally with said array of sensing elements.

6. The automatic rearview mirror system defined by claim 5, wherein said array of sensing elements and said signal processor are constructed on said semiconductor substrate as an integrated circuit.

7. The automatic rearview mirror system defined by claim 1, wherein said at least one variable reflectance rearview mirror is an electrochromic mirror.

8. The automatic rearview mirror system defined by claim 1, wherein said signal processor is an integrated circuit.

9. The automatic rearview mirror system defined by claim 1, further comprising a memory, connected to said array and to said signal processor, receiving and storing the electrical signals output by said sensing elements, wherein said signal processor receives the electrical signals stored in said memory.

10. The automatic rearview mirror system defined by claim 9, wherein said memory is a random-access-memory.

11. The automatic rearview mirror system defined by claim 1, wherein said signal processor is a microprocessor.

12. The automatic rearview mirror system defined by claim 1, further comprising a memory that is connected to said array and said signal processor, wherein said memory receives and stores the electrical signals output by said sensing elements and outputs the electrical signals to the signal processor, wherein said signal processor uses the electrical signals output from said memory to determine the first and second electrical signals and stores the first and second electrical signals in said memory, wherein said signal processor uses the first and second electrical signals output from said memory to determine the at least one control signal.

13. The automatic rearview mirror system defined by claim 1, wherein said signal processor determines said second electrical signal indicative of at least one peak light level in at least one zone of said area rearward of said at least one variable reflectance rearview mirror.

14. The automatic rearview mirror system defined by claim 13, wherein said signal processor determines a plurality of the second electrical signals indicative of a plurality of peak light levels, wherein each of the second electrical signals correspond to at least one zone of the area rearward of said at least one variable reflectance mirror, and wherein said signal processor determines and outputs a corresponding plurality of the control signals based on the first and the plurality of second electrical signals.

15. The automatic rearview mirror system defined by claim 1, wherein said signal processor samples the electrical signals indicative of the sensed light levels at a substantially constant sampling rate and varies the exposure time relative to the background light level.

16. The automatic rearview mirror system defined by claim 1, wherein said array of sensing elements is a photosensor array and said sensing elements are photosensor elements arranged in a two-dimensional array of rows and columns, wherein each of said photosensor elements generates a photosensor element signal indicative of the light levels of light incident thereon.

17. The automatic rearview mirror system defined by claim 16, wherein said signal processor determines the first electrical signal indicative of the background light level by calculating an average of the photosensor element signals indicative of the light levels of light incident on said photosensor elements in the lowest X rows of said photosensor array, wherein X is a positive integer less than the number of rows in said photosensor array.

18. The automatic rearview mirror system defined by claim 16, wherein said signal processor determines the first electrical signal indicative of the background light level by using X percent of the photosensor element signals indicative of the light levels of light incident on said photosensor elements, wherein X is a positive number not greater than 100, and averaging said X percent of the photosensor element signals.

19. The automatic rearview mirror system defined by claim 18 wherein X is approximately 100.

20. The automatic rearview mirror system defined by claim 16, wherein said signal processor determines the first electrical signal indicative of the background light level by using X percent of the photosensor element signals indicative of the lowest light levels of light incident on said photosensor elements, wherein X is a positive number not greater than 100, and averaging said X percent of the photosensor element signals.

21. The automatic rearview mirror system defined by claim 20, wherein X is between approximately 5 and 100.

22. The automatic rearview mirror system defined by claim 20, wherein X is approximately 75.

23. The automatic rearview mirror system defined by claim 16, wherein said signal processor determines the second electrical signal indicative of the at least one peak light level by using Y percent of the photosensor element signals indicative of the highest light levels of light incident on a predetermined set of said photosensor elements, wherein Y is a positive number not greater than 100, and averaging said Y percent of the photosensor element signals.

24. The automatic rearview mirror system defined by claim 23, wherein Y is in the range of from approximately 1 to 25.

25. The automatic rearview mirror system defined by claim 23, wherein Y is approximately 10.

26. The automatic rearview mirror system defined by claim 16, wherein said signal processor determines said control signal according to the formula:

$$V_C(z) = V_1 + (R_1 - S \times C_T \times B/P(z)) \times (V_2 - V_1)/(R_1 - R_2),$$

wherein $V_C$ is the voltage of the at least one control signal determined by said signal processor, $V_1$ is the approximate voltage which, when applied to said at least one variable reflectance rearview mirror, causes said at least one variable reflectance rearview mirror to begin perceptibly decreasing its reflectance from its maximum reflectance level $R_1$, S is a sensitivity factor, $C_T$ is the maximum contrast ratio of the peak light level to the background light level, B is the background light level, P(z) is the at least one peak light level, and $V_2$ is the approximate voltage which, when applied to said at least one variable reflectance rearview mirror, causes said at least one variable reflectance rearview mirror to decrease its reflectance to approximately its minimum reflectance level $R_2$.

27. The automatic rearview mirror system defined by claim 16, wherein said signal processor tests the photosensor element signal output from each photosensor element to determine whether the photosensor element signal output from each photosensor element is indicative of a peak light level or a background light level.

28. The automatic rearview mirror system defined by claim 27, further comprising an imaging system comprising a lens to focus an image of the area rearward of said at least one variable reflectance rearview mirror onto said photosensor array of photosensor elements, wherein said system further comprises means for applying a lens correction factor to each photosensor element signal output from each photosensor element.

29. The automatic rearview mirror system defined by claim 28, wherein the lens correction factor is in the range of approximately 1 to 15.

30. The automatic rearview mirror system defined by claim 27, wherein said signal processor determines a value indicative of the light level sensed by each photosensor element and compares each determined value with a predetermined peak threshold value to determine whether the photosensor element signal output from each photosensor element is indicative of a peak light level or a background light level.

31. The automatic rearview mirror system defined by claim 1,
  wherein said signal processor determines that a photosensor element signal output from one of said photosensor elements is indicative of a background light level when the determined value indicative of the sensed light level of said one of said photosensor elements is not greater than the peak threshold value, and
  wherein said signal processor determines that a photosensor element signal output from said one of said photosensor elements is indicative of a peak light level when the determined value indicative of the sensed light level of said one of said photosensor elements is greater than the peak threshold value.

32. The automatic rearview mirror system defined by claim 31, wherein the peak threshold value is in the range of approximately 200 to 255.

33. The automatic rearview mirror system defined by claim 31, wherein said signal processor counts the number of determined values greater than the peak threshold value in a predetermined set of determined values corresponding to a predetermined set of photosensor elements and determines the second electrical signal indicative of the at least one peak light level in the area rearward of said at least one variable reflectance rearview mirror as a function of the number of determined values greater than the peak threshold value in the predetermined set of determined values.

34. The automatic rearview mirror system defined by claim 30, wherein said signal processor determines the first electrical signal, indicative of a background light level by summing the determined values determined to be not greater than the peak threshold value and dividing the resulting sum by the number of determined values determined to be not greater than the peak threshold value.

35. The automatic rearview mirror system defined by claim 30,
  wherein said photosensor array means is located in said at least one variable reflectance rearview mirror so as to receive light through an active layer of said at least one variable reflectance rearview mirror from the area rearward of said at least one variable rearview reflectance,mirror, and
  wherein said signal processor applies a color correction factor to each value indicative of the sensed light level for each photosensor element to compensate for the reduction in transmitted light levels when the reflectance level of said at least one variable reflectance rearview mirror is reduced.

36. The automatic rearview mirror system defined by claim 16, wherein said signal processor uses the first electrical signal to determine a third electrical signal indicative of a change-limited background light level in the area rearward of said at least one variable reflectance rearview mirror, and wherein said signal processor determines the at least one control signal from the second and third electrical signals.

37. The automatic rearview mirror system defined by claim 36, wherein the automotive vehicle further comprises vehicle lighting, wherein said signal processor determines a vehicle lighting control signal using the third electrical signal, wherein said system further comprises at least one vehicle lighting switch, connected to said signal processor and to the vehicle lighting, receiving the vehicle lighting control signal from said signal processor and turning on or turning off the vehicle lighting in response thereto.

38. The automatic rearview mirror system defined by claim 1, wherein said at least one variable reflectance rearview mirror comprises a plurality of segments each of whose reflectance is independently controllable by said signal processor, and wherein said signal processor controls each of the segments of said at least one variable reflectance rearview mirror using the electrical signals from a corresponding set of sensing elements of said array.

39. The automatic rearview mirror system defined by claim 1, wherein the light levels in the area rearward of said at least one variable reflectance rearview mirror comprise light levels from a rear window area, at least a portion of a right side window area and at least a portion of a left side window area, and wherein said photosensor array has a two-dimensional field of view comprising said rear window area, said at least a portion of a right side window area and said at least a portion of a left side window area.

40. The automatic rearview mirror system defined by claim 39, wherein said photosensor array comprises 40 rows of said photosensor elements, each row comprising 160 of said photosensor elements.

41. The automatic rearview mirror system defined by claim 1, wherein the system comprises a plurality of said drive circuits and the variable reflectance rearview mirrors, wherein said signal processor determines and outputs a plurality of the control signals to said plurality of said drive circuits, each of the control signals corresponding to a desired reflectance for each of said plurality of variable reflectance rearview mirrors, and wherein said plurality of said drive circuits, in response to the control signals, generate and apply a plurality of said drive signals to said plurality of variable reflectance rearview mirrors causing each of said variable reflectance rearview mirrors to assume a desired reflectance level associated therewith.

42. The automatic rearview mirror system defined by claim 41, wherein said photosensor array comprises a plurality of photosensor element sets, each of said sets corresponding to each of said plurality of variable reflectance rearview mirrors, wherein said signal processor determines and outputs a plurality of said second electrical signals indicative of the at least the one peak light level, wherein said signal processor uses the first electrical signal indicative of the background light level and the plurality of said second electrical signals to determine and output the control signal for each of said plurality of said drive circuits and said variable reflectance rearview mirrors associated therewith.

43. The automatic rearview mirror system defined by claim 41, wherein said photosensor array comprises a first photosensor element set and a second photosensor element set, and a lens for focusing light from a rear window area and from at least a portion of a side window onto said photosensor array, wherein said signal processor determines a first peak light signal indicative of a peak light level of light incident on the first photosensor element set, wherein said signal processor determines a second peak light signal indicative of a peak light level of light incident on the second photosensor element set, wherein said signal processor determines and outputs a first control signal indicative of a desired reflectance level for one of said plurality of variable reflectance rearview mirrors using the first peak light signal and the first electrical signal indicative of the background light level, wherein said signal processor determines and outputs a second control signal indicative of a desired reflectance level for another of said plurality of variable reflectance rearview mirrors using the second peak light signal and the first electrical signal indicative of the background light level, wherein said first control signal is received by one of said plurality of drive circuits which generates and applies a first drive signal to one of said plurality of variable reflectance rearview mirrors causing it to assume the desired reflectance level associated therewith, and wherein said second control signal is received by another of said plurality of drive circuits which generates and applies a second drive signal to another of said plurality of variable reflectance rearview mirrors causing it to assume the desired reflectance level associated therewith.

44. The automatic rearview mirror system defined by claim 43, wherein said plurality of variable reflectance rearview mirrors comprise a rearview mirror, a left side view mirror and a right side view mirror, wherein said photosensor array further comprises a third photosensor element set, wherein said light focused from said at least a portion of a side window area comprises light from at least a portion of a left side window area and light from at least a portion of a right side window area, wherein said signal processor determines a first peak light signal indicative of a peak light level incident on the first photosensor element set, wherein said signal processor determines a second peak light signal indicative of a peak light level incident on the second photosensor element set, wherein said signal processor determines a third peak light signal indicative of a peak light level incident on the third photosensor element set, wherein said signal processor determines and outputs first, second and third control signals indicative of a desired reflectance for said rearview mirror, said left side view mirror and said right side view mirror, respectively, using each of the first, second, and third peak light signals and the first electrical signal indicative of the background light level, wherein each of the first, second and third control signals are output to each of said drive circuits associated therewith to generate and apply a first, second and third drive signal to said rearview mirror, said left side view mirror, and said right side view mirror, respectively, causing said mirrors to assume the desired reflectance level associated therewith.

45. The automatic rearview mirror system defined by claim 1, wherein said array of sensing elements comprises an analog photosensor array of photosensor elements, each of said photosensor elements generating analog photosensor element signals in response to light incident thereon, wherein said system further comprises an analog-to-digital converter connected to said analog photosensor array and said signal processor to convert the analog photosensor element signals to digital photosensor element signals, wherein said signal processor determines the first electrical signal indicative of the background light level using the digital photosensor element signals, wherein said signal processor determines the second electrical signal indicative of at least one peak light level using the digital photosensor element signals, wherein the control signal determined by said signal processor is a digital control signal, wherein said system further comprises a digital-to-analog converter connected to said signal processor and to said at least one drive circuit to convert the digital control signal to an analog control signal, and wherein said at least one drive circuit receives the analog control signal and in response thereto generates and applies a drive signal to said at least one variable reflectance rearview mirror to vary its reflectance level.

46. A control system for controlling a plurality of variable reflectance mirrors, each of which change their reflectance level in response to a drive signal from an associated drive circuit, for an automotive vehicle, comprising:

a plurality of variable reflectance mirrors;

a photosensor array mountable to face substantially towards a rearward area, wherein said photosensor array comprises a plurality of photosensor element sets, each set comprising a plurality of photosensor elements, each of said photosensor elements generating a photosensor element signal indicative of a light level of light incident thereon, and each of the sets corresponding to one of said plurality of variable reflectance mirrors, a control circuit, connected to said photosensor array, for determining and applying a plurality of control signals, each of the control signals indicative of a desired reflectance level for each of said plurality of variable reflectance mirrors in response to receiving the photosensor element signals from each of the plurality of photosensor element sets, a plurality of drive circuits connected to said control circuit, each of said plurality of drive circuits being connected to different ones of said plurality of variable reflectance mirrors associated therewith, wherein each of the control signals is output to said drive circuit associated therewith, to generate and apply a drive signal to each of said plurality of variable reflectance mirrors causing each of said mirrors to assume a reflectance level.

47. The control system defined by claim 46, wherein said control circuit determines a background light signal indicative of a background light level in response to receiving the photosensor element signals from at least one of the photosensor element sets, wherein said control circuit determines a plurality of peak light signals, each of said peak light signals being indicative of a peak light level incident on each of the photosensor element sets, wherein said control circuit determines a plurality of control signals, each of the control signals determined by using the background light signal and one of the plurality of peak light signals, associated with each of the plurality photosensor element sets, wherein said control circuit applies each of the plurality of control signals to a drive circuit associated therewith, each of said drive circuits generating and applying a drive signal to each of said variable reflectance mirrors associated therewith.

48. The control system defined by claim 47, wherein said photosensor array comprises a first set and a second set of photosensor elements, and a lens for focusing light from a rearward area onto said photosensor array, wherein said control circuit determines a first peak light signal indicative of a peak light level incident on the first photosensor element set in response to receiving photosensor element signals from the first photosensor element set, wherein said control circuit determines another peak light signal indicative of another peak light level incident on the second photosensor element set in response to receiving photosensor element signals from the second photosensor element set, wherein said control circuit determines a first control signal indicative of a desired reflectance for one of said plurality of variable reflectance mirrors using the first peak light signal and the background light signal, wherein said control circuit determines a second control signal indicative of another desired reflectance for another of said plurality of variable reflectance mirrors using the another peak light signal and the background light signal, wherein the first control signal controls a first drive circuit to generate a first drive signal in response to which said one of said plurality of variable reflectance mirrors is driven to the desired reflectance associated therewith, and wherein said second control signal controls a second drive circuit to generate a second drive signal in response to which said another of said plurality of variable reflectance mirrors is driven to the desired reflectance associated therewith.

49. The control system defined by claim 48, wherein said plurality of variable reflectance mirrors comprise a rearview mirror, a left side view mirror and a right side view mirror, wherein said light from said rearward area comprises light from a rear window area, light from a left side window area and light from a right side window area, wherein said photosensor array further comprises a third photosensor element set, each of said photosensor elements generating a photosensor element signal indicative of a light level incident thereon, wherein said control circuit determines a first peak light signal indicative of a peak light level incident on the first photosensor element set in response to receiving photosensor element signals from the first photosensor element set, wherein said control circuit determines a second peak light signal indicative of a second peak light level incident on the second photosensor element set in response to receiving photosensor element signals from the second photosensor element set, wherein said control circuit determines a third peak light signal indicative of a third peak light level incident on the third photosensor element set in response to receiving photosensor element signals from the third photosensor element set, wherein said control circuit determines a first control signal indicative of a desired reflectance level of said rearview mirror using the first peak light signal, and the background light signal, wherein said control circuit determines a second control signal indicative of a desired reflectance level of said left side view mirror using the second peak level signal and the background light signal, wherein said control circuit determines a third control signal indicative of a desired reflectance level of said right side view mirror using the third peak light signal and the background light signal, wherein said first control signal controls a first drive circuit to generate a first drive signal in response to which said rearview mirror is driven to the desired reflectance level associated therewith, wherein said second control signal controls a second drive circuit to generate a second drive signal in response to which said left side view mirror is driven to the desired reflectance level associated therewith, and wherein said third control signal controls a third drive circuit to generate a third drive signal in response to which said right side view mirror is driven to the desired reflectance level associated therewith.

50. A control system for controlling at least one variable reflectance mirror for an automotive vehicle, comprising:

photosensor array means for sensing light levels in an area rearward of said at least one variable reflectance mirror and generating photosensor array signals, means for determining a background light signal from the photosensor array signals;

means for determining a peak light signal from the photosensor array signals; and means for controlling a reflectance level of the at least one variable reflectance mirror using the background and peak light signals.

51. The control system defined by claim 50, wherein said controlling means comprises:

desired reflectance level determining means for determining a desired reflectance level for the at least one variable reflectance mirror by using said background and peak light signals; and desired reflectance control means for controlling the reflectance level of the at least one variable reflectance mirror using the determined desired reflectance level.

52. The control system defined by claim 51, wherein said photosensor array means comprises a plurality of photosensor elements arranged in a two-dimensional array of rows and columns, each of said plurality of photosensor elements generating a photosensor element signal indicative of a light level incident thereon, wherein said means for determining a background light signal determines the background light signal by calculating an average of the photosensor element signals corresponding to the light levels incident on said photosensor elements in the lowest X rows of said photosensor array means, wherein X is a positive integer less than the number of rows in said photosensor array means.

53. The control system defined by claim 51, wherein said photosensor array means comprises a plurality of photosensor elements, each photosensor element generating a photosensor element signal indicative of a light level of light incident thereon, wherein said means for determining a background light signal determines a background light signal by using X percent of the photosensor element signals, wherein X is a positive number not greater than 100, and averaging said X percent of the photosensor element signals.

54. The control system defined by claim 53, wherein X is approximately 100.

55. The control system defined by claim 51, wherein said photosensor array means comprises a plurality of photosensor elements, each photosensor element generating a photosensor element signal indicative of a light level of light incident thereon, wherein said means for determining a background light signal determines a background light signal by using X percent of the photosensor element signals indicative of the lowest light levels incident on said photosensor elements, wherein X is a positive number not greater than 100, and averaging said X percent of the photosensor element signals.

56. The control system defined by claim 55, wherein X is between approximately 5 and 100.

57. The control system defined by claim 55, wherein X is approximately 75.

58. The control system defined by claim 51, wherein said photosensor array means comprises a plurality of photosensor elements for sensing light levels in an area rearward of said at least one variable reflectance mirror, each photosensor element generating photosensor element signals indicative of a light level incident thereon, wherein said means for determining a peak light signal determines a peak light signal by determining the average value of Y percent of the photosensor element signals indicative of the highest light levels of light incident on a predetermined set of said photosensor elements, wherein Y is a positive number not greater than 100, and averaging said Y percent of the photosensor element signals.

59. The control system defined by claim 58, wherein Y is in the range of approximately 1 to 25.

60. The control system defined by claim 58, wherein Y is approximately 10.

61. The control system defined by claim 51, wherein said desired reflectance level determining means determines a control signal indicative of the desired reflectance level according to the formula:

$$V_C(z) = V_1 + (R_1 - S \times C_T \times B/P(z)) \times (V_2 - V_1)/(R_1 - R_2)$$

wherein $V_C$ is the voltage of the at least one control signal determined by said signal processor, $V_1$ is the approximate voltage which, when applied to said at least one variable reflectance mirror, causes said at least one variable reflectance mirror to begin perceptibly decreasing its reflectance from its maximum reflectance level $R_1$, S is a sensitivity factor, $C_T$ is the maximum contrast ratio of the peak light level to the background light level, B is the background light level, P(z) is the at least one peak light level, and $V_2$ is the approximate voltage which, when applied to said at least one variable reflectance mirror, causes said at least one variable reflectance mirror to decrease its reflectance to approximately its minimum reflectance level $R_2$.

62. The control system defined by claim 51, wherein said means for determining a peak light signal tests the photosensor array signals to determine whether each photosensor array signal is indicative of a peak light level, and wherein said means for determining a background light signal tests the photosensor array signals to determine whether each photosensor array signal is indicative of a background light level.

63. The control system defined by claim 62, further comprising an imaging system comprising a lens to focus an image of the area rearward of said at least one variable reflectance mirror onto said photosensor array means, and means for applying a lens correction factor to each photosensor array signal.

64. The control system defined by claim 63, wherein the lens correction factor is in the range of approximately 1 to 15.

65. The control system defined by claim 62, wherein said means for determining a peak light signal determines a value indicative of the second light level corresponding to each photosensor array signal and compares each determined value with a predetermined peak threshold value to determine whether each photosensor array signal is indicative of a peak light level, and wherein said means for determining a background light signal determines a value indicative of the sensed light level corresponding to each photosensor array signal and compares each determined value with a predetermined peak threshold value to determine whether each photosensor array signal is indicative of a background light level.

66. The control system defined by claim 65, wherein said means for determining a background light signal determines that a photosensor array signal is indicative of a background light level when the determined value indicative of the sensed light level corresponding to one of the photosensor array signals is not greater than the peak threshold value, and wherein said means for determining a peak light signal determines that a photosensor array signal is indicative of a peak light level when the determined value indicative of the sensed light level corresponding to the one of the photosensor array signals is not less than the peak threshold value.

67. The control system defined by claim 66, wherein the peak threshold value is in the range of approximately 200 to 255.

68. The control system defined by claim 66, wherein said means for determining the background light signal determines the background light signal by summing the determined values determined to be not greater than the peak threshold value and dividing the resulting sum by the number of determined values determined to be not greater than the peak threshold value.

69. The control system defined by claim 66, wherein said means for determining the peak light signal counts the number of determined values not less than the peak threshold value in a predetermined set of determined values corresponding to a predetermined set of photosensor elements of said photosensor array means and determines the peak light signal in the area rearward of the at least one variable refelctance mirror as a function of the number of determined values not less than the peak threshold value in the predetermined set of determined values.

70. The control system defined by claim 65, further comprising a means for applying a color correction factor, wherein said photosensor array means is located in the at least one variable reflectance mirror so as to receive light through an active layer of said at least one variable reflectance mirror from the area rearward of said at least one variable reflectance mirror, and wherein said means for applying a color correction factor applies a color correction factor to each value indicative of the sensed light level for each photosensor array signal to compensate for the reduction in transmitted light levels when the reflectance level of the at least one variable reflectance mirror is reduced.

71. The control system defined by claim 51, wherein said desired reflectance level determining means uses the background light signal to determine a change-limited background light signal, and wherein said desired reflectance level determining means uses the change-limited background signal to determine the desired reflectance level.

72. The control system defined by claim 51, further comprising means for determining a plurality of peak light signals, wherein said means for determining a desired reflectance determines the desired reflectance for a plurality of variable reflectance mirrors using the background light signal and the plurality of the peak light signals, and wherein said desired reflectance control means controls each of said plurality of variable reflectance mirrors using the desired reflectance for each of said plurality of variable reflectance mirrors.

73. The control system defined by claim 72, wherein said photosensor array means comprises a first set and a second set of photosensor elements, and a lens for focusing light from a rear window area and from at least a portion of a side window onto said photosensor array means, each photosensor element generating a photosensor element signal indicative of a light level incident thereon, wherein said means for determining a plurality of peak light signals determines a peak light signal indicative of a peak light level of light incident on the first photosensor element set from photosensor element signals of the first set and determines another peak light signal indicative of another peak light level of light incident on the second photosensor element set from photosensor element signals of the second set, wherein said means for determining a desired reflectance determines the desired reflectance for one of said variable reflectance mirrors using the peak light signal corresponding to the first photosensor element set and the background light signal, and wherein said means for determining a desired reflectance determines the desired reflectance for another of said variable reflectance mirrors using the peak light signal corresponding to the second photosensor element set and the background light level.

74. The control system defined by claim 73, wherein the plurality of variable reflectance mirrors comprises a rearview mirror, a left side view mirror and a right side view mirror, wherein said light from a side window area comprises light from at least a portion of a left side window area and light from at least a portion of a right side window area, wherein said photosensor array means comprises a third set of photosensor elements, each of said photosensor elements generating a photosensor element signal indicative of a light level incident thereon, wherein said means for determining a plurality of peak light signals determines a first peak light signal indicative of a peak light level of light incident on the first photosensor element set, a second peak light signal indicative of a peak light level of light incident on the second photosensor element set and a third peak light signal indicative of a peak light level of light incident on said third photosensor element set from photosensor element signals associated, respectively, with the first, second and third photosensor element sets, wherein said means for determining a desired reflectance determines a desired reflectance of said rearview mirror using the first peak light signal and the background light signal, wherein said means for determining a desired reflectance determines a desired reflectance of said left side mirror using the second peak light signal and the background light signal, wherein said means for determining a desired reflectance determines a desired reflectance of said right side mirror using the third peak light signal and the background light signal, and wherein said desired reflectance control means controls the rearview mirror, the left side mirror, and the right side mirror, respectively, using the desired reflectance of the rearview mirror, the left side mirror, and the right side mirror.

75. The control system defined by claim 51, wherein said photosensor array signals are analog signals, wherein said system further comprises analog-to-digital conversion means for converting the analog photosensor array signals to digital photosensor array signals, wherein said means for determining a background light signal determines a background light signal from the digital photosensor array signals, and wherein said means for determining a peak light signal determines a peak light signal from the digital photosensor array signals, wherein said desired reflectance level determining means determines the desired reflectance level and produces a digital control signal indicative thereof, wherein said system further comprises digital-to-analog conversion means to convert the digital control signal to an analog control signal, and wherein said desired reflectance control means controls the reflectance level of the at least one variable reflectance mirror using the analog control signal.

76. A method of controlling the reflectance of at least one variable reflectance mirror comprising the steps of:

sensing light levels in an area rearward of the at least one variable reflectance mirror with an array of sensing elements;

determining a background light level from the sensed light levels;

determining a peak light level from the sensed light levels; and controlling a reflectance level of the at least one variable reflectance mirror using the determined background and peak light levels.

77. The method defined by claim 76, wherein the array has a plurality of rows of sensing elements, and wherein said step of determining a background light level comprises the step of determining the background light level by calculating an average of the sensed light levels in the lowest X rows of the array, wherein X is a positive integer less than the number of rows in the array.

78. The method defined by claim 76, wherein said step of determining a background light level comprises the step of determining a background light level by using X percent of the sensed light levels, wherein X is a positive number not greater than 100, and averaging said X percent of the photosensor element signals.

79. The method defined by claim 76, wherein said step of determining a background light level comprises the step of determining a background light level by using X percent of the lowest sensed light levels, wherein X is a positive number not greater than 100, and averaging said X percent of the photosensor element signals.

80. The method defined by claim 76, wherein said step of determining a peak light level comprises the step of determining a peak light level by using Y percent of the sensed light levels indicative of the highest sensed light levels, wherein Y is a positive number not greater than 100, and averaging said Y percent of the photosensor element signals.

81. The method defined by claim 76, wherein the at least one variable reflectance mirror changes it reflectance in response to the application of a voltage thereto, wherein said controlling step determines a desired reflectance level for the at least one variable reflectance mirror according to the formula:

$$V_C(z)=V_1+(R_1-S\times C_T\times B/P(z)\times (V_2-V_1)/(R_1-R_2),$$

wherein $V_C(z)$ is a voltage representing the desired reflectance level, $V_1$ is the approximate voltage which, when applied to the at least one variable reflectance mirror, causes the at least one variable reflectance mirror to begin perceptibly decreasing its reflectance from its maximum reflectance level $R_1$, S is a sensitivity factor, $C_T$ is the maximum contrast ratio of the peak light level to the background light level B is the determined background light level, P(z) is the determined peak light level, and $V_2$ is the approximate voltage which, when applied to the at least one variable reflectance mirror, causes the at least one variable reflectance mirror to decrease its reflectance to approximately its minimum reflectance level $R_2$, wherein said controlling step comprises the step of applying the voltage $V_C(z)$ to the at least one variable reflectance mirror to cause the at least one variable reflectance mirror to assume the determined desired reflectance level.

82. The method defined by claim 76, wherein said sensing step comprises the step of sensing the light level of light incident on each sensing element of the array, and wherein said method further comprises the step of testing the light level sensed by each sensing element of the array to determine whether each light level is indicative of a peak light level or a background light level.

83. The method defined by claim 82, wherein said testing step comprises the step of comparing each sensed light level of each sensing element of the array with a predetermined peak threshold value to determine whether each light level is indicative of a peak light level or a background light level.

84. The method defined by claim 83, wherein said testing step comprises the step of determining that a sensed light level of a sensing element is indicative of a background light level when the sensed light level is not greater than the peak threshold value, and wherein said testing step further comprises the step of determining that a sensed light level of a sensing element is indicative of a peak light level when the sensed light level is greater than the peak threshold value.

85. The method defined by claim 84, wherein said background light level determining step comprises the step of determining a background light level by summing the sensed light levels sensed by each sensing element that are determined to be not greater than the peak threshold value and dividing the resulting sum by the number of sensed light levels determined to be not greater than the peak threshold value.

86. The method defined by claim 85, wherein said peak light level determining step comprises the steps of counting the number of sensed light levels greater than the peak threshold value in a predetermined set of sensed light levels corresponding to a predetermined set of sensing elements of the array, and determining a peak light level in the area rearward of the at least one variable reflectance mirror as a function of the number of sensed light levels greater than the peak threshold value in the predetermined set.

87. The method defined by claim 76, further comprising the step of:

determining a plurality of peak light levels for a plurality of areas rearward of the at least one variable reflectance mirror, wherein said controlling step comprises the step of determining a desired reflectance for each of a plurality of variable reflectance mirrors using the determined background light level and the plurality of peak light levels, and wherein said controlling step further comprises the step of controlling the reflectance of each of the plurality of variable reflectance mirrors using the determined desired reflectance for each of the plurality of variable reflectance mirrors.

* * * * *